United States Patent [19]
Blomberg

[11] 4,225,019
[45] Sep. 30, 1980

[54] BRAKING SYSTEM SENSOR AND METHOD

[76] Inventor: Folke I. Blomberg, Duvstigen 4, S-181, 40 Lidingo, Sweden

[21] Appl. No.: 952,961

[22] Filed: Oct. 20, 1978

Related U.S. Application Data

[63] Continuation-in-part of Ser. No. 657,104, Feb. 11, 1976, Pat. No. 4,061,212, and Ser. No. 847,669, Nov. 1, 1977.

[30] Foreign Application Priority Data

Jan. 11, 1977 [SE] Sweden .............................. 7712342
Apr. 24, 1978 [SE] Sweden .............................. 7804673

[51] Int. Cl.³ ............................................. B60T 8/16
[52] U.S. Cl. ............................... 188/181 R; 310/168; 303/22 R
[58] Field of Search ........... 188/181 A, 181 F, 181 R; 200/61.46; 303/22 R, 93, 95, 97; 310/168

[56] References Cited
U.S. PATENT DOCUMENTS

| | | | |
|---|---|---|---|
| 3,802,747 | 4/1974 | Burckhardt et al. | 188/181 A X |
| 3,908,805 | 9/1975 | Morse et al. | 188/181 A |
| 3,953,691 | 4/1976 | Grosseau | 188/181 R X |
| 3,979,153 | 9/1976 | Ingram et al. | 188/181 R X |
| 3,998,298 | 12/1976 | Fleagle | 188/181 R |

*Primary Examiner*—Duane A. Reger
*Attorney, Agent, or Firm*—Bell, Seltzer, Park & Gibson

[57] ABSTRACT

A sensor for responding to the rate of change of changing rotational speed of a rotating member such as a vehicle wheel and including a flyweight coupleable for rotation in response to wheel rotation and selectively decoupleable in response to the exertion on the flyweight of an inertia torque having a magnitude greater than a threshold magnitude due to a change in rotational speed of the member. In accordance with the present invention, control means for exerting on the flyweight torques resisting decoupled rotation of the flyweight takes the form of a restraining mechanism, while signalling of any occurrence of an excessive rate of change of rotational speed of the member is accomplished through a magnetically actuable electrical switch.

51 Claims, 18 Drawing Figures

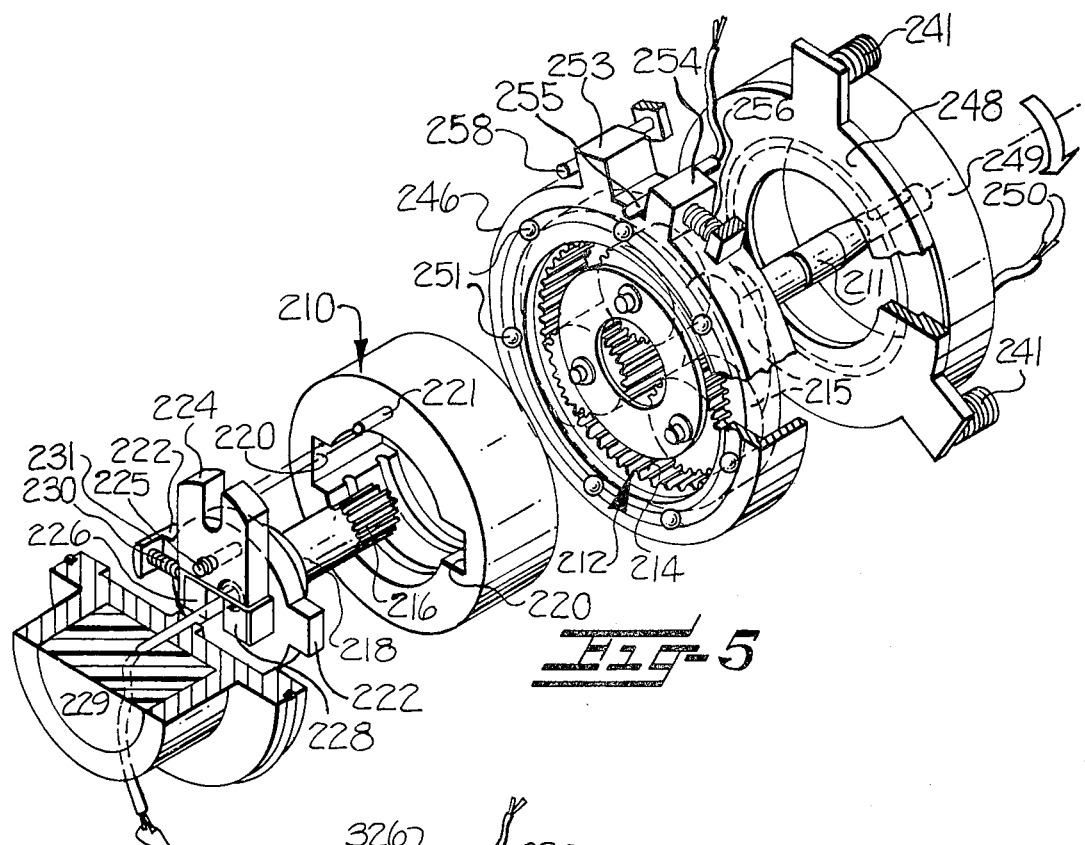
_Fig-5_
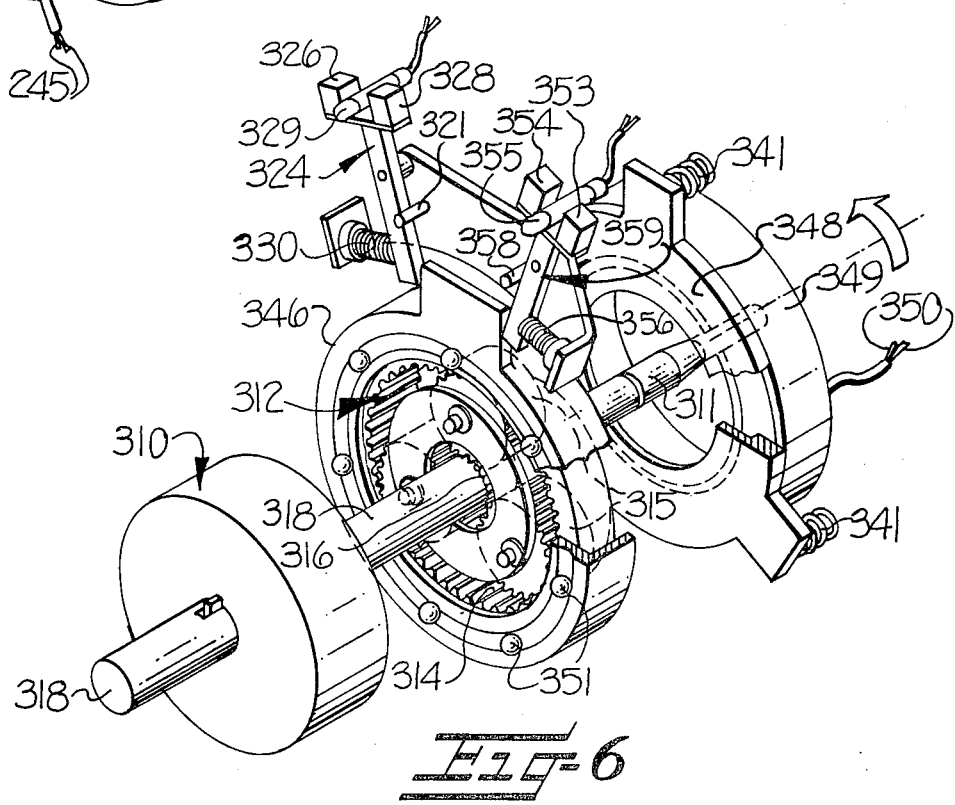
_Fig-6_

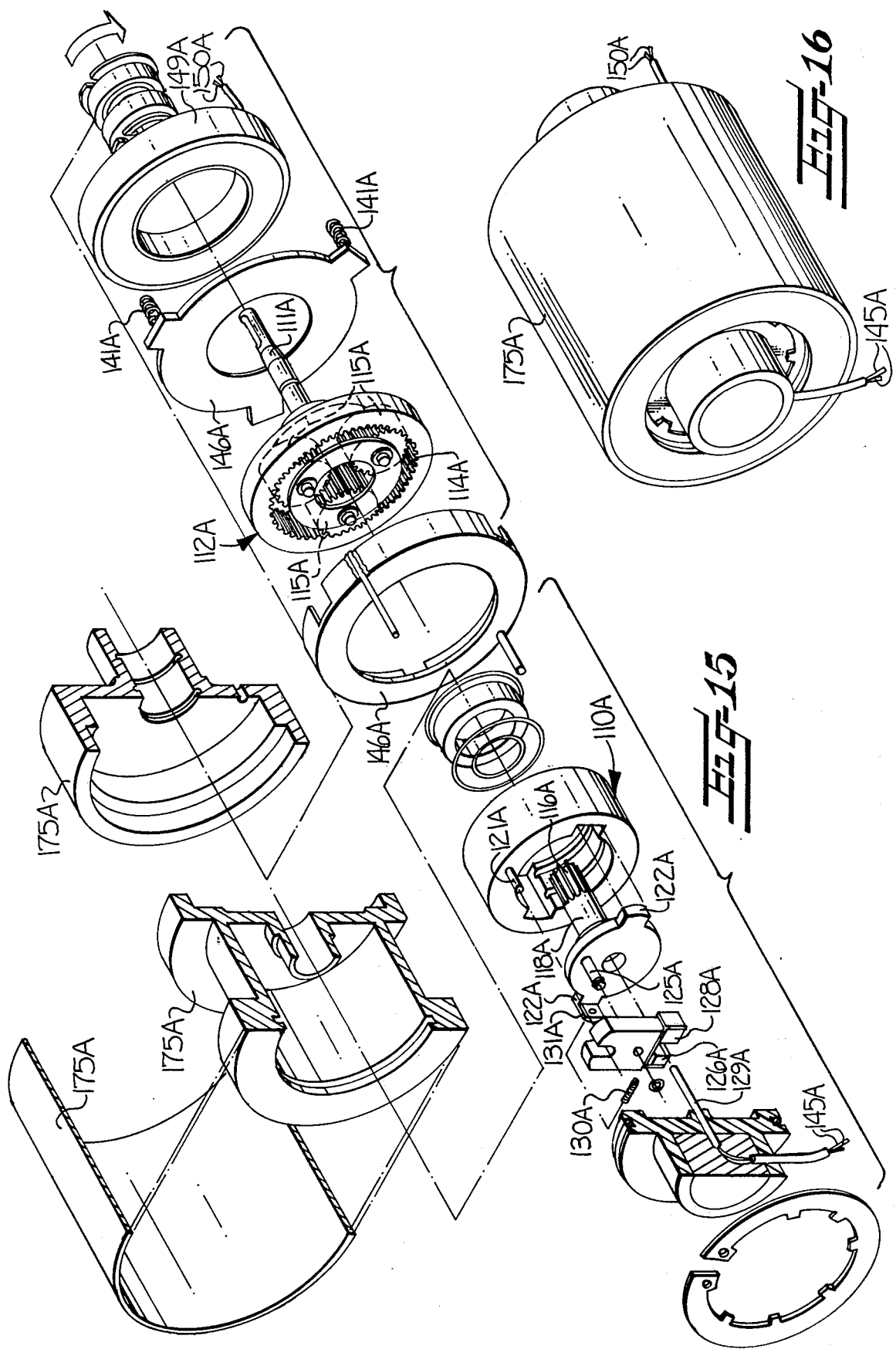

BRAKING SYSTEM SENSOR AND METHOD

This application is a continuation-in-part of earlier application Ser. No. 657,104 filed Feb. 11, 1976 and now U.S. Pat. No. 4,061,212 and of copending application Ser. No. 847,669 filed Nov. 1, 1977. Prior U.S. Pat. No. 4,061,212 is hereby incorporated by reference to any extent necessary to a full understanding of this application.

TECHNICAL FIELD AND BACKGROUND OF THE INVENTION

It is desirable or necessary in a number of apparatus and processes to sense the rate of change of changing rotational speeds of a rotatable element. One example of such a need is found in connection with the use of brake modulators for varying the braking effect exerted on a rotating member such as an automotive vehicle wheel. A variety of approaches to sensing rates of change of changing rotational speeds and/or vehicle wheel slip have been proposed heretofore, as will be recognized by persons familiar with prior patents relating to the field of this invention.

In connection with the use and development of such sensors and braking arrangements incorporating such sensors, it has become common to define the operating conditions for a system in part by a so-called "skid number", referring to the multiple by a hundred of a coefficient of friction between a vehicle wheel and a road surface over which a vehicle moves. Prior sensors, particularly those employing a frictional coupling and a physical contact or microswitch electrical signalling arrangement, have heretofore achieved success for skid numbers of approximately 80 or higher where much vehicle operation occurs. Nevertheless, as work with such sensors has continued, it has been found desirable to provide a sensor with long operating life, which is easily maintained, and which is adaptable to a wide range of skid numbers and vehicle operating conditions.

BRIEF SUMMARY OF THE INVENTION

With the above discussion in mind, it is an object of the present invention to accomplish proper operation of a sensor over a wide range of coefficients of road-wheel friction or vehicle operating conditions. In realizing this object of the present invention, an arrangement is provided for exerting, on a flyweight which is coupleable for rotation in response to wheel rotation, torques resisting decoupled rotation of the flyweight, with the rotation resisting torques being an average of a plurality of resistive torques. By such averaging of torques applied, accommodation of a range of vehicle operating conditions is facilitated.

Yet another object of the present invention is to vary the operating characteristics of a sensor in accordance with variations in vehicle operating characteristics. In realizing this object of the present invention, rotation resisting torque which is controllably exerted on a decoupled flyweight is weighted or biased by vehicle conditions such as brake fluid pressures and/or vehicle loaded weight.

Yet a further object of the present invention is to provide a sensor which, under conditions of use such as in an automotive vehicle, accomplishes electrical signalling of occurrences of excessive rates of retardation without requiring physical contact with an electrical switch element or microswitch. In realizing this object of the present invention, a sensor in accordance with this invention includes a magnetically actuable electrical switch and permanent magnetic elements movable relative to the switch for controlling switch operation without requiring physical contact. Such actuation of an electrical switch achieves an extended operating life, while the switch structure additionally accommodates ready replacement of any failed switch.

BRIEF DESCRIPTION OF THE DRAWINGS

Some of the objects of the invention having been stated, other objects will appear as the description proceeds, when taken in connection with the accompanying drawings, in which

FIGS. 5, 6, 7 and 8 are views similar to FIGS. 1 and 2 illustrating varying forms of sensors in accordance with the present invention;

FIG. 15 is an exploded perspective view of components of one actual embodiment of a sensor in accordance with this invention;

FIG. 16 is a perspective view of the sensor of FIG. 15, as assembled;

DETAILED DESCRIPTION OF THE INVENTION

While the present invention will be described more fully hereinafter with reference to the accompanying drawings, it is to be understood at the outset of the detailed description of this invention that it is contemplated that various modifications of the invention as described may be made by persons skilled in the appropriate arts. For that reason, the detailed description is to be read broadly, and not as limiting on the scope of this invention.

Figure 1:
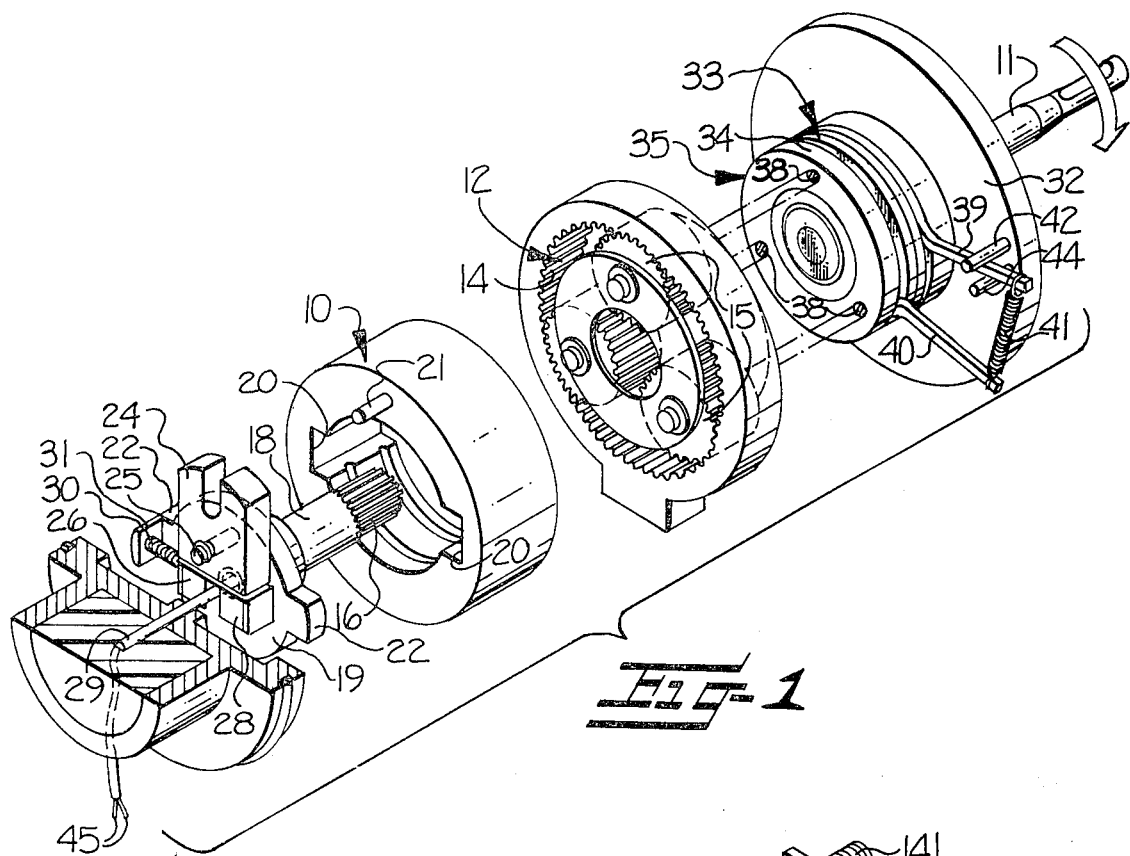
FIG. 1 is a perspective view of one form of sensor responsive to the rate of change of changing rotational speeds of a rotatable element, in accordance with the present invention.

Referring now more particularly to the accompanying drawings, FIG. 1 will be noted as disclosing a sensor for responding to the rate of change of changing rotational speeds of a rotating member such as a vehicle wheel. The sensor of FIG. 1 includes a flyweight 10 coupleable for rotation (in the direction indicated by an arrow) in response to wheel rotation by means of a shaft 11. The flyweight 10 and shaft 11 are coupleable through means including a planetary gearing generally indicated at 12 and having an orbit gear 14, planet gears 15, and a sun gear 16. The sun gear 16 is formed integrally with an interconnecting shaft 18 and a disc member 19 for purposes to be described more fully hereinafter. The flyweight 10 and the interconnecting shaft 18 are arranged so as to permit relative rotation therebetween, and the flyweight has a plurality of keyway restraining means 20 and a magnet carrier actuating pin 21. The restraining keyways 20 trap ears 22 extending from the disc 19 and thus limit the degree of freedom of relative rotational movement between the flyweight 10 and the interconnecting shaft 18. A magnet carrier 24 is mounted on the disc 19 for pivotal movement about a mounting pin 25, and carries a pair of magnets 26, 28 which straddle a reed switch 29. The magnets 26, 28 preferably are permanent magnets mounted in field opposing or bucking positions, but may be electromagnets. The magnet carrier 24 is normally maintained in a predetermined pivotal position relative to the disc 19 and the reed switch 29 by a setting spring 30, arranged to act between the magnet carrier 24 and a lug 31. By means of the setting spring 30 and engagement of the magnet carrier 24 with the actuating pin 21 which extends from the flyweight 10, a torque resisting relative rotation between the flyweight and the shaft 18, is exerted. The tension in the spring 30, and thus the magnitude of the resisting torque, can be adjusted by providing appropriate means such as a screw.

Upon rotation of the shaft 11, a drive disc 32 fixed thereto is rotated and rotates the flyweight by means of a stick-slip coupling in the form of band means 33 wound helically about a circumferential surface 34 of a band encircled member 35. The band encircled member 35, which is mounted by bearing means for rotation relative to the shaft 11, carries a plurality of planet gear shafts 38 by which rotational motion is transmitted through the planetary gearing 12. The band 33 includes a pair of projecting arms 39, 40 with a spring 41 extending therebetween. One arm 39 is captured between a pair of pins 42, 44 extending from the drive disc 32 which is fixed to the shaft 11. The band and associated elements exert on an element of the planetary gearing torques resisting relative rotation between the flyweight and the shaft.

As will be appreciated from the discussion above, rotation of the shaft 11 and the corresponding vehicle wheel or other rotatable member at varying rotational speeds will lead to rotation of the flyweight 10, disc 19 and magnet carrier 24 about an axis defined by the interconnecting shaft 18. The reed switch 29 is located on that axis, and thus is subjected to an essentially steady, rotating magnetic field defined between the magnets 26, 28. The poles of those magnets are arranged in such a manner that the magnetic fields thereof oppose one another, and one of the magnets has a field strength higher than the other. With the flyweight 10 and drive disc 19 being biased into a particular rotational relationship by means of the setting spring 30, the reed switch 29 and magnet carrier 24 are arranged in such a manner that the contacts within the envelope of the reed switch 29 are normally maintained open at all rotational positions of the magnet carrier 24 thereabout.

Upon deceleration of the vehicle wheel or rotating member to which the shaft 11 is operatively connected, the flyweight 10, magnet carrier 24, disc 19 and interconnecting shaft 18 will slow together for so long as the inertia torques caused by changing rotational speeds of the wheel and acting on the flyweight and the magnet carrier are less than a predetermined threshold torque. Upon such torque exceeding the predetermined threshold, the flyweight 10 and the magnet carrier 24 move relative to the disc 19 and interconnecting shaft 18 to the extent permitted by the ears and keyways and against the force of the setting spring 30. Such relative arcuate movement between the actuating pin 21 fixed in the flyweight 10 and the pivot pin 25 on which the magnet carrier 24 is mounted gives rise to a pivotal movement of the magnet carrier 24 relative to the disc 19. With such pivotal movement, the magnets 26, 28 are displaced relative to the reed switch 29 and the axis of the interconnecting shaft 18, in such a manner that a different portion of the opposing fields thereof acts on the switch elements within the envelope of the reed switch 29, closing the contacts and emitting an electrical sensor signal through conductors 45 extending therefrom. The flyweight 10 is then decoupled from the shaft 11, within a controled average torque, by means of the stick-slip action of the restraining means formed by the helically wound coil member 33. Stick-slip restraints may be exerted on or between other elements of a gearing while retaining the characterizing features of this invention, for example on the orbit gear 14 as will be described hereinafter.

Persons skilled in the applicable arts will recognize that such actuation of an electrical signalling means by use of opposing magnetic fields to control an appropriate switch such as a Hall effect semiconductor or contact elements within the sealed envelope of a reed switch has the characteristic of being repeatable for a greatly extended operating life, far in excess of the operating life of a physical contact electrical switch or a switching device such as a microswitch. At present, a reed switch is preferred for reasons of cost. Additionally, positioning of the switch in axial alignment with the shafts of the sensor and at an endmost portion thereof facilitates ready access to the switch in the event that failure thereof requires corrective maintenance during the life of the sensor of the present invention.

Persons skilled in the applicable arts will recognize, on careful study of the present invention, that the magnet carrier 24 cooperates with the mass hereinabove referred to as the flyweight 10 by effectively contributing to the inertia of the rotating elements which are here collectively referred to as the "flyweight". In order that the sensor according to this invention will not be susceptible to linear acceleration and deceleration as a vehicle mounting the sensor moves along a road, the magnet carrier 24 is in static balance about the pivot pin 25 on which it is mounted. Being in such balance, and contributing to total flyweight inertia, the magnet carrier may take any desired shape relative to other masses contributing to flyweight inertia and any desired relative proportion of the total inertia. A variation on such an approach will be described more fully hereinafter. Selection of such factors will facilitate control over response times of sensors in accordance with this invention.

As briefly described above, the flyweight 10 of a sensor in accordance with FIG. 1 is mounted for rotation relative to a drive means in the form of a shaft 11. The flywheel 10 is operatively interconnected with a disc 32 by a yieldable coupling means for selectively decoupling and recoupling the flyweight, preferably in the form of band means wound helically about a circumferential surface 34 of the band encircled member 35. In the form illustrated, and as described in U.S. Pat. No. 4,061,212 which is hereby incorporated by reference to any extent necessary to a full understanding of this invention, the band means comprises a helically wound coil 33, the ends of which are outwardly bent to form two substantially radially directed arms 39, 40. Between the ends of the radially directed arms 39, 40 a coil spring 41 is inserted for urging the arms 39, 40 towards each other.

Desirably, the inner diameter of the coil 33 is suitably slightly larger than the diameter of the circumferential surface 34 (which the spring encircles) in the absence of the biasing force exerted by the control spring 41. As will be understood, the exertion of force drawing together the arms 39 and 40 of the coil 33 reduces the inner diameter of the band means, causing the band means to be tightened about the circumferential surface 34. Thus, the band means is capable of functioning as a yieldable interconnecting means coupling the disc 32 and band encircled member 35 at any relative rotational positions thereof.

The principle of the yielding interconnection thus provided will be easily understood from a consideration of the formula $P = Qe^{\mu a}$ which expresses certain relationships involving a rope or the like wound about a cylinder and involving the magnitude of a force amplification obtained in such an arrangement. In this formula:

e = Base of the natural logarithm system
$\mu$ = The frictional coefficient between rope and cylinder
$a$ = Total angle expressed in radians by which the rope embraces the cylinder
$e^{\mu a}$ = The amplification factor Thus, if one end of the rope is held with the force Q, the force P on the other end is required to cause the rope to slide around the cylinder.

In the context of the present invention, where the coil 33 functions as a portion of a yieldable interconnecting means, it will be understood that the coil can be given such a number of helical turns and such dimensions, including selection of the length of the arms 39, 40 and the free internal diameter in relation to the diameter of the circumferential surface 34, that the force exerted by the control spring 41 can be determined to render the band means self-locking if an attempt is made to turn the band means in the direction of the arrow by acting on one arm 40 or if an attempt is made to turn the band means oppositely by acting on the other arm 39, inasmuch as the band means will be wound more tightly about the circumferential surface.

However, when an attempt is made to turn the band means clockwise by acting on the one arm 40, such an attempt will be successful upon a force being applied which is capable of overcoming the resisting force of the torque control spring 41. Upon overcoming such torque control force, the band means starts unwinding from the circumferential surface 34 and accommodates relative rotation between the flyweight 10 and the disc 32 as a stick-slip frictional coupling. As will be understood, such decoupling and recoupling occurs irrespective of the relative rotational positions between the flyweight 10 and the disc 32.

It will be noted that the means interconnecting the shaft 11 (drivingly connected with a rotatable element such as a vehicle wheel) and the flyweight 10 includes the planetary gearing arrangement generally indicated at 12. The planetary gearing arrangement 12 includes a sun gear 16 formed integrally with the interconnecting shaft 18 for transmitting rotation to the disc member 19. The planetary gearing arrangement 12 additionally has three planet gears 15, each in engagement both with the sun gear 16 and with the orbit gear 14. The orbit gear 14 is fixed, while the planet gears 15 are driven in rotation by means of the yieldable coupling described above. More particularly, each of the planet gears 15 is mounted on a corresponding planet gear stub shaft 38 extending from the band encircled member 35. The band encircled member 35 defines the circumferential surface 34 which is engaged by the band means 33. Further, the rotatable element 35 is mounted for rotation relative to the shaft 11. The band means 33 has a pair of radially extending arms 39, 40 and a spring 41 acting therebetween. One of the arms, illustrated to be the one arm 39, is fixed relative to the disc member 32 by a pair of axially extending pins 42, 44 straddling and entrapping the one arm 39.

As will be understood, the flyweight 10 is normally drive in rotation at a known ratio of rotational speeds by the transmission of rotation from shaft 11 through the band means 33, rotatable element 35, planetary gearing arrangement 12, and interconnecting shaft 18. One preferred ratio has been for the flyweight to normally rotate in a ratio of 5:1 to a vehicle wheel. In the event of operation in accordance with a sequence of events as described above, yielding of the interconnecting means occurs between the rotatable element 35 and the disc member 32 which are normally coupled by the band means 33.

Figure 2:
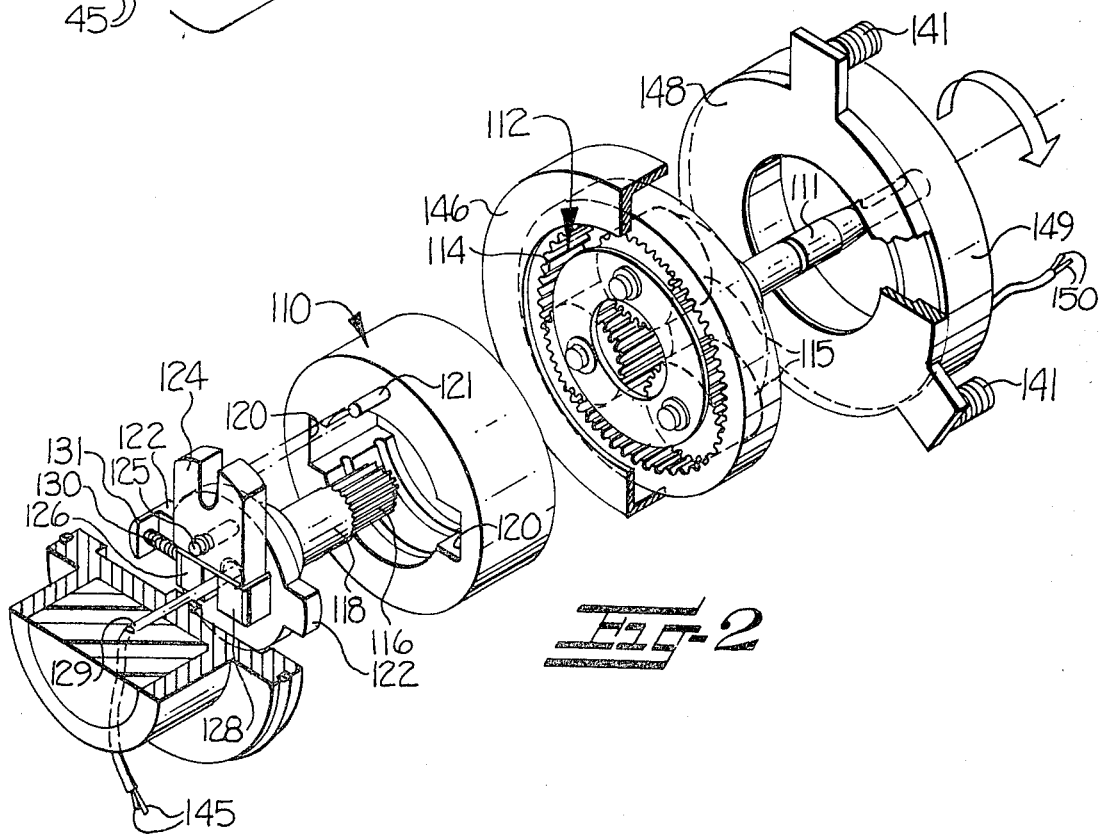
FIG. 2 is a view similar to FIG. 1, showing a second form of sensor in accordance with the present invention.

The present invention additionally contemplates that the control means for exerting on a flyweight of a sensor torques resisting decoupled rotation of the flyweight may take the form of an electrically operated coupling, clutch or brake. In at least some particular forms here illustrated, it is proposed that an electromagnetic device be employed in conjunction with portions of a planetary gear train. One such sensor arrangement is illustrated in FIG. 2, where elements corresponding to elements of the sensor of FIG. 1 have been identified with similar reference characters of a one hundred series. Those elements which have been described hereinabove and which function similarly in the sensor of FIG. 2 will not be again described at length.

It is recognized that the word "coupling" is frequently used for mechanical devices operating in such a manner that relative movement is possible between different members so that connection and disconnection of the members relative to each other is possible. The word "brake" is generally used for devices giving a retarding effect upon other members. Certain classes of devices, however, function both as couplings and as brakes and the present invention (as described more fully hereinafter) contemplates the use of a wide range of such devices. By way of example and not by way of limitation, such devices may include electromagnetically operated frictional couplings or clutches, eddy current couplings, magnetic powder couplings, magnetic hysteresis couplings, viscous couplings of various types, and dynamoelectric devices.

While the range of devices described above are useful in sensors in accordance with the present invention, those capable of giving a rapid and distinct connection and disconnection when an electrical current is applied and removed are preferable. Devices having those characteristics include, among others, magnetic hysteresis and magnetic powder couplings which have the additional advantage of exerting a desired total torque without the necessity that portions of the coupling move relative to one another. While at least some of the other above-mentioned types of devices may appear simpler and less expensive, such other devices frequently require that at least a certain relative turning movement occur between portions of the coupling in order for a torque to be exerted, giving rise to discernible differences for the values at which the sensors produce signals. Such differences will be found acceptable for certain applications of sensors in accordance with the present invention, and found unacceptable for others. Where the choice is made to rely upon some device in which a solenoid or other electrical winding creates a magnetic field controlling torque, some form of constant current circuit must be used to assure constant torque. Otherwise torque might vary uncontrollably with fluctuations in current arising from supply voltage or temperature dependent resistance changes in circuitry elements.

In distinction from the sensor of FIG. 1, in which a stick-slip restraint is exerted on the planet gears of the planetary gearing 12, the sensor of FIG. 2 imposes a stick-slip restraint on the orbit gear of the planetary gearing 112. More particularly, the orbit gear 114 is housed for controlled rotation relative to stationary elements of the sensor and to the other elements of the planetary gearing 112 and is captured between a backing plate 146 and a pressure plate 148 which is urged into engagement with the orbit gear 114 by a plurality of springs 141. The pressure plate 148 may be withdrawn from engagement with the orbit gear 114 under the influence of an electromagnetic coil 149 energized under the control of the reed switch 129 through conductors 150 which are suitably electrically connected with the conductors 145, directly or through a suitable relay means, so as to be responsive to sensor signalling.

Figure 3:
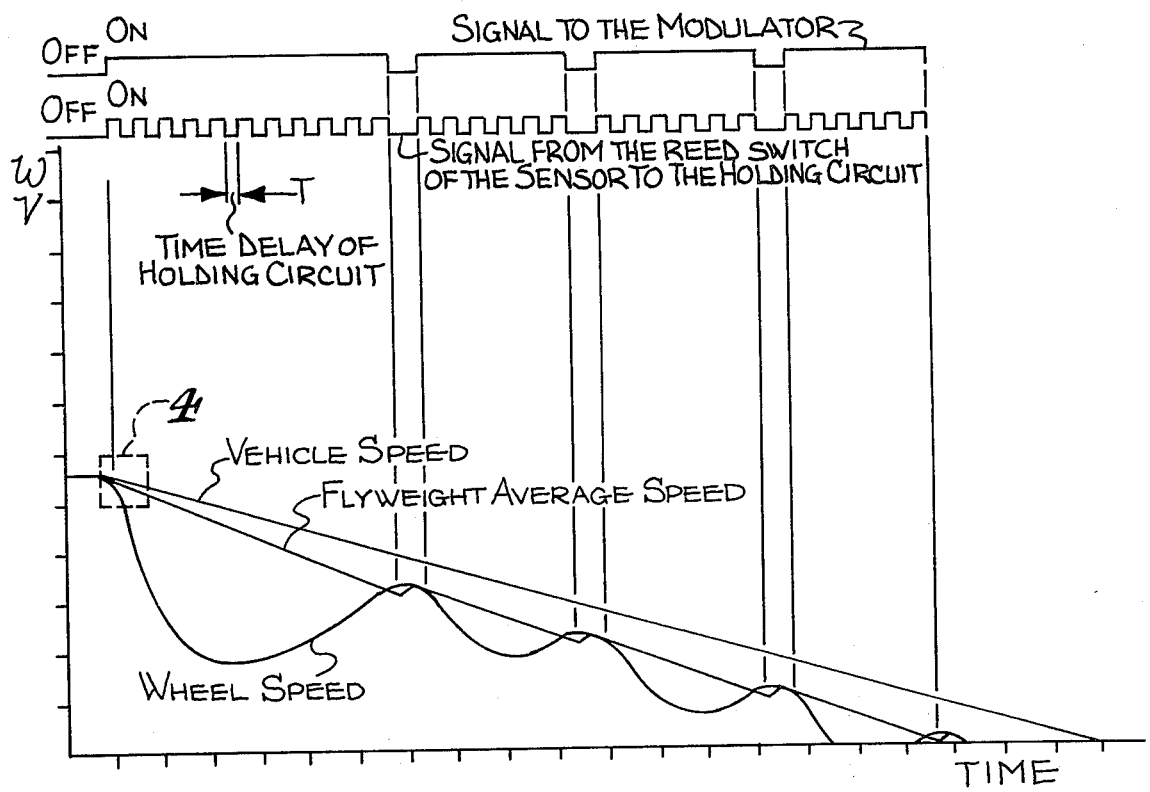
FIG. 3 is a diagram illustrating a course of events during deceleration of the rotational speed of a rotatable element and reflecting the operation of a sensor such as that of FIG. 2.
Figure 4:
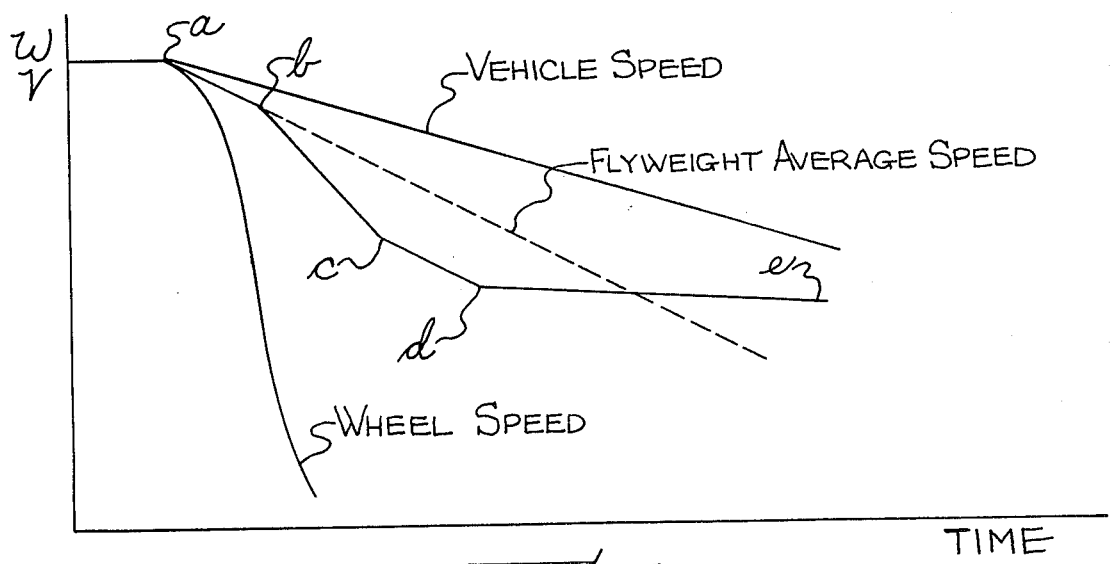
FIG. 4 is an enlargement of a portion of the diagram of FIG. 3, particularly illustrating events occurring within a fractional portion of the time represented in the diagram of FIG. 3.

The manner in which the stick-slip restraint exerted by the arrangement of FIG. 2 functions may be made more clear by reference to the diagrams of FIGS. 3 and 4. The diagram of FIG. 3 will be recognized as showing that flyweight deceleration is reset during cycles of deceleration and acceleration of wheel speed. The diagram of FIG. 4 represents a fractional portion of the first cycle of decelerating and accelerating wheel speed following initiation of braking action, and has been greatly enlarged for purposes of making the following discussion more clear.

In connection with the following description of events there illustrated and other points in the present description, the expression "slip" has been and will be used. "Slip" is understood by persons working in the applicable arts as representing a difference between vehicle speed and any corresponding peripheral speed of a vehicle wheel, divided by vehicle speed. Such a number is multiplied generally by a factor of 100 and expressed in a percentage. Extensive tests have shown that slip values or slip percentages for maximum braking effect should be in the range of 15 to 25 percent, depending upon existing road conditions.

As will be recognized by persons knowledgeable in connection with sensors for responding to the rate of change of changing rotational speeds of an element such as a vehicle wheel, the velocities of a wheel and vehicle will frequently appear, immediately before braking is begun, substantially constant and in direct relationship one to the other (that is, with zero percentage slip). Such a condition is indicated by a single straight, generally horizontal line to the left of point a in FIG. 4. Upon initiation of braking effort applied to a wheel, wheel speed dips (toward progressively greater slip percentages) while vehicle speed decreases at some lower deceleration rate. Braking initiation is indicated at point a in FIG. 4, from which point lines for wheel speed and vehicle speed diverge.

In accordance with the present invention, the flyweight 110 is subjected, from point a to point b on a flyweight speed curve, to a torque imposed by the setting spring 130, in the event that the braking force applied to the wheel is sufficiently great to cause the wheel to decelerate at a rate which exceeds the preset threshold value of the sensor. At some point between points a and b, the magnet carrier 124 is pivoted so as to bring about closing of the normally open contacts of the reed switch 129. Such closing of the contacts of the reed switch 129 conducts an electrical signal over the conductors 145, which electrical signal is supplied directly or indirectly to the conductors 150 of the coil or winding 149. In order to increase the life of the reed switch 129, a suitable electromechanical or semiconductor relay means may be electrically interposed between the switch and the winding 149. Energization of the coil or winding 149 creates a magnetic field which tends to move the pressure plate 148 against the force of the restraining springs 141. However, as is known to persons familiar with electromagnetic machinery, any such movement occurs during an interval of time referred to as a "pull in" time. During the pull in time, a restraining force is exerted between opposing plates 146, 148 against the orbit gear 114 of the planetary gearing 112, with the resultant resisting torque being determined by the frictional characteristics of the sliding opposing surfaces and the force of the restraining springs 141. During such interval of time, the interconnecting shaft 118 and flyweight 110 are decoupled from the input shaft 111 by means of the planetary gearing 112, in that the orbit gear 114 rotates in accommodation of the differential in torques caused by changing rotational speeds of a wheel and acting on the flyweight and the magnet carrier. The flyweight 110 is decelerated (along the line b–c in FIG. 4) at a rate which reflects the relatively high torque applied to the orbit gear 114 and resisting decoupled rotation.

When pull in of the pressure plate 148 has been completed (at point c in FIG. 4) the flyweight 110 and associated members are released for relatively free rotation. For an intermediate period (between points c and d in FIG. 4), the flyweight 110 is subject to a torque resulting from the force of the setting spring 130 as the magnet carrier 124 pivots back to a position at which the contacts of the reed switch 129 are in the normal open condition, which occurs at some point intermediate points c and d. With restoration of the magnet carrier 124 to its normal position, the force exerted by the setting spring 130 no longer acts to decelerate the flyweight 110 and the flyweight decelerates at a rate which reflects minimal torques exerted thereon due to bearing friction, gear meshing forces and the like. This portion of the sequence is represented by the line from point d to point e in FIG. 4.

As will be appreciated, opening of the contacts of the reed switch 129 de-energizes the coil or winding 149, permitting the pressure plate 148 to re-engage the orbit gear 114. However, such re-engagement requires an interval of time known to persons skilled in the applicable arts as a "drop out" time. Upon completion of the drop out time interval (at point e) the succession of occurrences described hereinabove repeats, so that the flywheel is subjected to the controllable exertion thereon of a plurality of torques, with the torques applied over a succession of extremely short intervals of time alternating among the various torques. It is this plurality of resistive torques which are indicated by the varying slopes, in FIG. 4, of the successive line portions from point a to point b; from point b to point c; from point c to point d; and from point d to point e. As indicated by the dashed line for flyweight average speed on the greatly enlarged view of FIG. 4, a very rapid alternation among the plurality of resistive torques has the effect of exerting on the flyweight the average of that plurality of resistive torques. In certain embodiments of the present invention, opening and closing of the contacts of the reed switch 129 proceeds at frequencies on the order of from about 15 to about 100 hertz. Preferably, operation is in a frequency range of from about 30 to about 50 hertz. As a result of this rate of alternation, the flyweight 110 is subjected to a deceleration which may be regarded as substantially constant, at a rate which is determined from an average of the resistive torques applied thereto. It is this flyweight deceleration or decelerating speed which is indicated in FIG. 3.

While the relatively high rate of alternation of signals coming from the reed switch 129 permits achieving an important characteristic of this invention, by exerting on the flyweight an average of a plurality of resistive torques, it will be appreciated by persons skilled in pertinent brake anti-locking arts that such a relatively high rate of alternation of signals to a modulator may not be desirable. This may be dealt with in several ways, including providing an electrical or electronic circuit means between the conductors 145 of the reed switch 129 and the modulator which smooths or otherwise responds to signals from the reed switch 129 by emitting a signal which continues for that interval of time in which modulator operation is required. Alternatively, the modulator structure employed may be one which is inherently insensitive to high rates of alternation of sensor signals.

Figure 14:
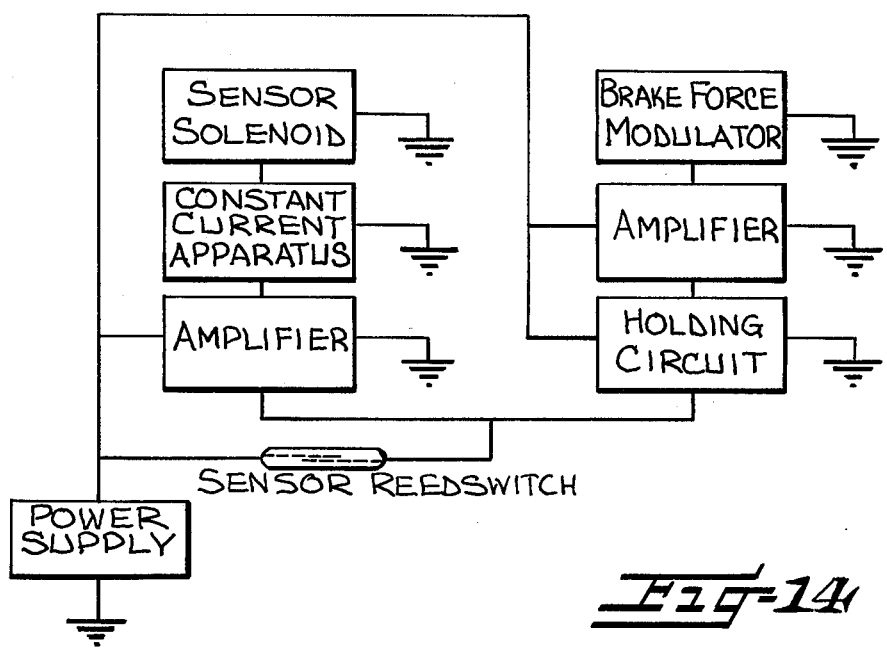
FIG. 14 is a schematic diagram of electrical circuit elements as used with certain sensors in accordance with this invention.

The alternation of signals coming from the reed switch is indicated schematically in FIG. 3. Additionally, the emission of a signal which continues for that interval of time in which modulator operation is required is additionally indicated. One form of circuit capable of accomplishing this type of operation, as well as having other desirable characteristics brought out more fully hereinafter, is schematically illustrated in FIG. 14. As there shown, the reed switch 129 supplies a signal to two series of circuits indicated in block diagram form. One series of circuits includes an amplifier and a constant current circuit, while the other includes a holding circuit and an amplifier. These circuits are so designed that, when the reed switch 129 is open or nonconductive, neither the coil or winding 149 nor the modulator are supplied with electrical current. Upon closure of the reed switch 129, the coil or winding 149 is energized through the constant current circuit while the brake modulator is energized through the holding circuit. When operation of the contacts of the reed switch 129 proceeds at frequencies in the range specified above, the time delay (T in FIG. 3) is chosen to be sufficient to maintain energization of the brake force modulator. As will be appreciated by persons skilled in the applicable arts, the operation of the amplifiers and other circuit elements may be varied to accommodate other types of couplings and brakes and/or other types of modulators.

As will be appreciated, determination of a flyweight deceleration by exerting on the flyweight an average of a plurality of resistive torques opens great opportunities for careful design and selection of desired characteristics for operation of a sensor. More particularly, varying the physical size and force of the restraining springs 141 will permit variation in pull in and drop out times, which will in turn vary the duration of intervals in the sequence of alternation among torques, thereby effectively varying the slope of the flyweight decelerating speed. Similarly, the field strength of the winding or coil 149 may be varied to have somewhat comparable effects. Particularly with relation to the coil or winding 149, the pressure plate 148 may cooperate with switch elements to vary voltage levels during the sequence of events illustrated in FIG. 4, in such a manner that a relatively high voltage or current is applied during pull in, to more quickly disengage the pressure plate 148, followed by application of a lower holding voltage or current which will permit a quicker drop out. Such variation in voltages and currents applied will permit weighting the intervals of time during which the flyweight 110 is subjected to the higher and lower torques and may also accommodate adaptation of sensor g settings as described hereinafter.

As will be appreciated from the above discussion, the controlled rate of deceleration of the flyweight is achieved by alternating rapidly and in succession among a plurality of torques. The greatest range of possibilities for adjusting flyweight average speed to a desired slope would exist where the maximum torque exerted (indicated in FIG. 4 by the slope of the line between the points b and c) was infinite, and the minimum torque (indicated in FIG. 4 by the slope of the line between points d and e) was infinitesimal. While practical embodiments of sensors in accordance with the present invention will not achieve this theoretical ideal, it is apparent that a designer is presented with a wide range of parameters from which a selection may be made in order to achieve desired operation. The slope of the various lines representing flyweight speeds in FIG. 4, which reflect g settings, may lie at various angulations and extend for varying intervals of time, thereby accomplishing desired braking control with modulators of varying design characteristics and capabilities.

As will be noted from FIG. 3, the flyweight average speed is shown to overshoot wheel speed, in that the line for an accelerating wheel "crosses over" the line for the flyweight, showing the wheel rotating at greater than flyweight speed for some interval. The magnitude of such overshooting is, at least in part, dependent upon sensor frequency or response times and will be greater at slower sensor frequencies. The magnitude of overshooting is also, however, dependent upon the characteristics of any electrical or electronic circuit means inserted between the reed switch 129 and the modulator as described above. Maximum overshooting would occur when the reed switch signal goes off just as flyweight speed matches wheel speed and would equal any delay period imposed by the circuit means, e.g., time T (FIG. 3). Minimum overshooting would occur when the reed switch signal goes off prior to flyweight speed matching wheel speed, by an interval just infinitesimally greater than any delay period. In actuality, overshooting will vary randomly between such maximums and minimums. This fact, and the fact that sensor frequency is always much higher than the frequency at which the anti-skid system decreases and increases braking force renders the influence of overshooting negligible.

The use of a backing plate abutting one side of an orbit gear in a planetary gearing set opens up other and further possibilities for sensor arrangements in accordance with the present invention, several of which are illustrated in FIGS. 5 through 7, 10 through 12 and 15 through 18. Elements of the sensors of those figures corresponding to elements of the sensors described hereinabove with reference to FIGS. 1 and 2 have been identified by comparable reference characters of 200, 300, 400, 500, 600, 700 and 800 order. The discussion of the various sensor arrangements which follows will be directed particularly to the distinguishing characteristics of the varying sensors, rather than to the common characteristics which have been discussed hereinabove.

Referring now more particularly to FIG. 5, the backing plate 246 which cooperates with the pressure plate 248 in gripping the orbit gear 214 preferably is supported by an anti-friction bearing means such as a plurality of ball members 251, so as to permit at least a degree of rotational movement of the backing plate 246 relative to fixed elements of the sensor such as the coil or winding 249. The backing plate 246 is formed with a projecting ear portion mounting a pair of magnets 253, 254 which straddle a reed switch 255 in general similarity to the arrangement of magnets 226, 228 cooperating with the reed switch 229 as described hereinabove. By means of a suitable spring 256, the backing plate 246 is normally biased toward one particular position, as established by a limiting pin 258 engaging one of the magnets 253. With the sensor rotating as shown by the arrow in FIG. 5, the two reed switches 229, 255 function to respectively signal in response to deceleration of the input shaft 211 exceeding a predetermined rate and acceleration thereof exceeding a predetermined rate.

In the arrangement of FIG. 6, the backing plate 346 has a projecting ear which actuates a pair of magnet carriers 324, 359 each mounted for pivotal movement relative to a corresponding reed switch 329, 355. In this form, separate reed switches 329, 355 for signalling acceleration and deceleration are retained, but both are operated from the limited rotational movement of the backing plate 346. As a consequence, the flyweight 310 may be fixed to the intermediate shaft 318, in distinction from the arrangements described hereinabove. The two setting springs 330, 356 control acceleration and deceleration settings, respectively, when the sensor rotates as shown by the arrow.

Figure 7:
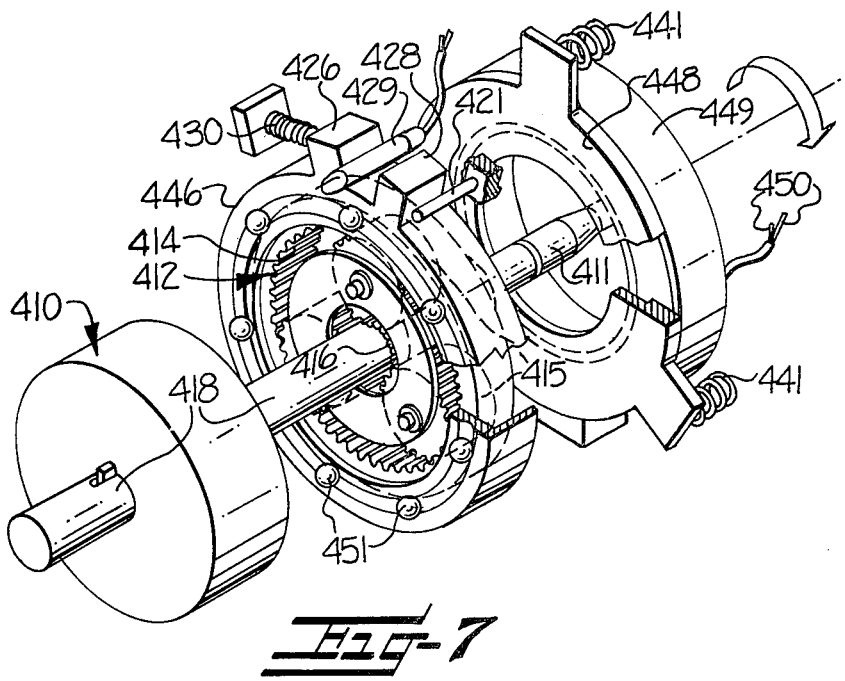

With appropriate circuitry to accompany the sensor, such an arrangement may be employed with a single reed switch 429, as illustrated in FIG. 7, where the sensor signals on deceleration when rotating in the direction of the arrow.

As pointed out briefly hereinabove, it is contemplated that the coupling employed may be other than a clutch of an electromagnetically operated friction type.

For purposes of clarity and in order to assure full understanding of such alternative non-contact couplings as are particularly disclosed hereinafter, it is appropriate to briefly describe the functional characteristics and features of magnetic powder and magnetic hysteresis couplings. Such devices may have a stator and a rotor. The stator may comprise a rotationally symmetrical member of iron having an inner cylindrical coupling surface. The rotor may also be formed, at least in part, by a rotationally symmetrical iron member rotatably mounted relative to the stator and having an outer cylindrical coupling surface which turns with a relatively small gap or spacing with regard to the coupling surface of the stator. A solenoid or electrical winding is arranged so that the stator and rotor provide opposite poles, such as where the stator provides a south pole and the rotor a north pole. The gap between the stator and the rotor may be filled by magnetic particles or powder (if so desired) in which case the device is of a magnetic powder type. Under the influence of the magnetic field in the gap between the rotor and stator, such magnetic powder will coalesce and resist relative turning motion between the rotor and the stator, with the magnitude of the resistance being dependent upon the dimensions and proportions of the coupling device and the quantity of magnetic powder employed. For any certain coupling, the magnitude of the resistance to turning movement is directly proportional to field strength, that is to the current applied to the electrical winding or solenoid. The torque is essentially independent of rotational speed. A magnetic powder coupling can provide large torques from a coupling of relatively small size and with low current consumption, but suffers from a possible deficiency in that the coupling is subject to wear and deterioration of the magnetic powder.

In a hysteresis coupling, the rotor is generally provided by a drum or flat disc of magnetizable material. Such couplings are broadly known and, in at least certain forms, are available from manufacturers known to persons skilled in the art. In a coupling of the magnetic hysteresis drum type, the drum may have only one end wall, to which a shaft is mounted concentrically with an outer surface of the drum. A stator may be provided by an outer and an inner part, each concentric with the rotor shaft and drum. A central opening through the inner part of the stator may receive the shaft of the drum and accommodate bearings for the shaft. Longitudinal grooves formed in the inner surface of the outer stator part and in the outer surface of the inner stator part, with the stator parts being so mounted that the grooves are displaced by half a pitch relative to each other. The material between the grooves thus provides a plurality of elongate pole pieces extending generally in the direction of the mounting shaft. The winding is so arranged that one of the stator parts functions as one magnetic pole and the other functions as the opposite magnetic pole, positioning the rotor between two magnetic fields in such a way that the material of the rotor is magnetized in a particular pattern and, during relative movement, the pattern of magnetization must be displaced in the mass of the rotor. Such continuous change in a magnetic field causes a loss, referred to as "hysteresis loss", which results in the exertion of a torque.

In the couplings described, the torque exerted is independent of rotational speed and will have the same magnitude at standstill or at any rotational speed. Losses in addition to air resistance and bearing losses, which are so small in couplings of the size with which the present invention is concerned as to be neglectable, essentially amount only to an unavoidable eddy current loss. Suitable structural design for such a coupling as a total unit and material choice for the components may maintain any non-linear part of the total torque exerted below one percent of total torque. Generally speaking, torque is proportional to stator magnetization, and thus directly proportional to current intensity.

Figure 8:
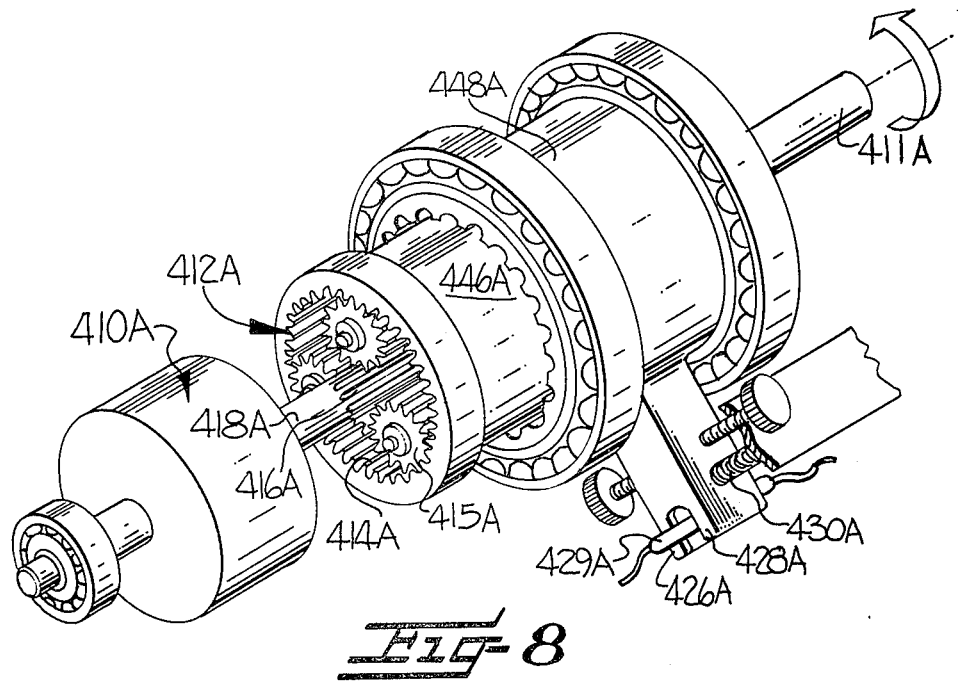
Figure 9:
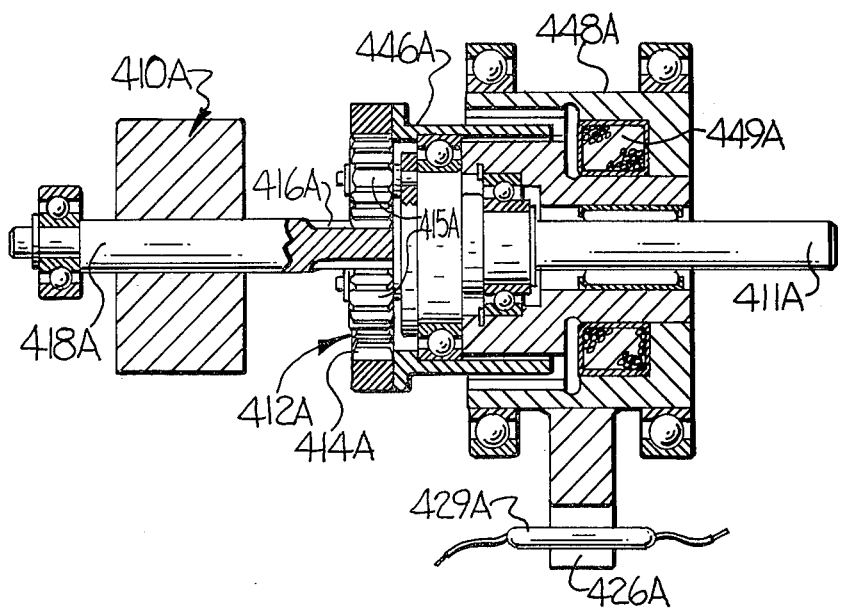
FIG. 9 is an elevation view, partly in section, of the sensor of FIG. 8.

The sensor of FIGS. 8 and 9 is one specific example of such an alternative coupling, shown particularly as a hysteresis coupling. Elements of the sensor of FIGS. 8 and 9 corresponding to elements described hereinabove have been identified by reference characters of a 400 order series, with the addition of a postscript A. Thus, a flyweight 410A is fixed to an intermediate shaft 418A and driven through a planetary gearing 412A in a manner generally similar to that described hereinabove. The coupling used in the sensor of FIGS. 8 and 9 has a coil or winding 449A arranged to direct magnetic flux through a stator 448A defining a generally annular opening for receiving a rotor 446A fixed to the orbit gear 414A of the planetary gearing 412A. The stator is free to move through a limited arc of movement, in a manner similar to the arrangements for the backing plates 246, 346, 446 in the sensors of FIGS. 5 through 7 described above.

The operation of the sensor of FIGS. 8 and 9 differs in some specifics from the operation of other sensors described hereinabove. More particularly, during operation at substantially constant rotational speeds (or at standstill) a spring 430A is effective for biasing magnet carriers 426A, 428A to a position at which the reed switch 429A is maintained in an open or non-conductive condition. In such condition, the winding 449A is maintained energized through a constant current supply and rotation of the input shaft of 411A is thus transmitted directly through the planetary gear 412A to the intermediate shaft 418A and thus the flyweight 410A. Upon the occurrence of a rate of retardation which exceeds that corresponding to the turning moment exerted by the spring 430A and the moment of inertia of the rotating elements, the force exerted by the spring 430A is overcome and the stator moves through the permitted arc of movement. As a result, the magnets are moved relative to the reed switch 429A to such a position that the reed switch 429A is closed or rendered conductive and operates, through associated circuitry, to de-energize the winding 449A. With de-energization of the winding, the stator is released to rotate as the spring 430A acts to return the stator to its prior position. This action is repeated at a relatively high frequency, such that the flyweight 410A is braked by an average torque determined between the maximum torque exerted by the hysteresis coupling and the small torque exerted by the planetary gearing and bearings.

Persons skilled in the appropriate arts will recognize that the hysteresis coupling of the sensor of FIGS. 8 and 9 may be readily converted into a magnetic particle or viscous coupling by providing appropriate seals and filling materials. The present invention contemplates such a modification of the arrangement described immediately hereinabove.

Figure 10:
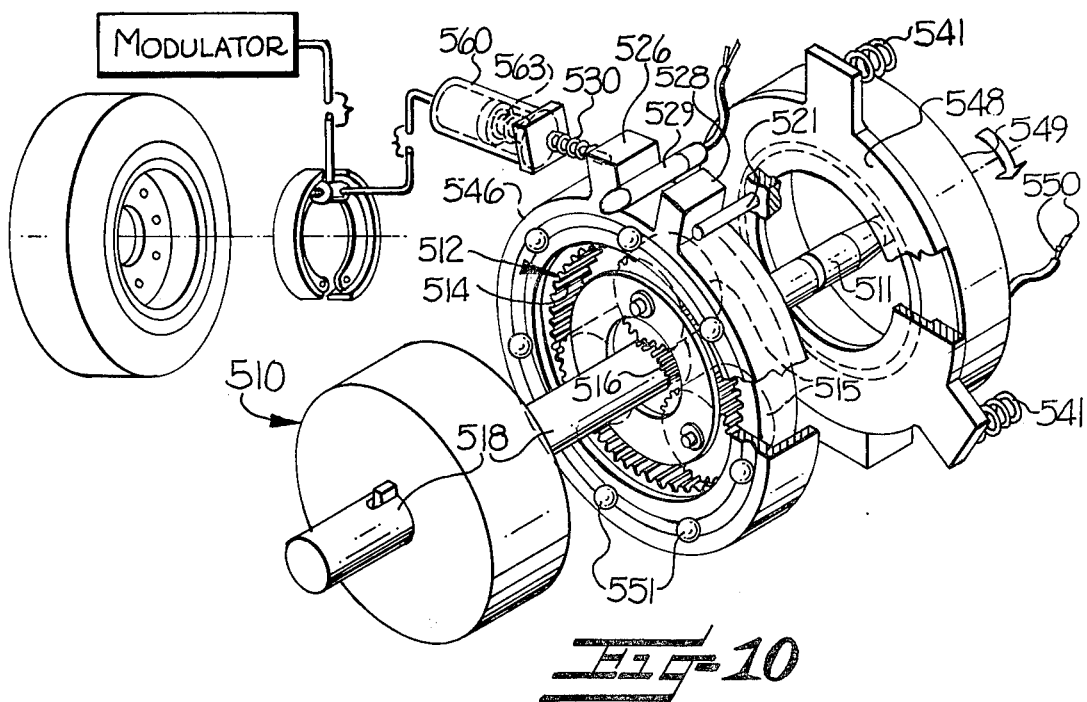
FIGS. 10, 11 and 12 are views similar to FIGS. 1, 2 and 5 through 8.

With such arrangements, the possibility is open for weighting of the average torque resisting rotation of the flyweight in yet another manner, as will now be described with reference to FIGS. 10 through 13. As shown in FIG. 10 where reference characters of a 500 order series are used, the force exerted by the setting spring 530 is adjusted by connecting the normally fixed end thereof with a piston of a pressurized fluid cylinder means 560. The cylinder means 560 operatively communicates with a brake conduit at a point between a modulator and a wheel cylinder to which pressurized hydraulic brake fluid is applied for slowing rotation of the wheel or other rotatable member with which the shaft 511 is connected. The piston moves under the pressure of brake fluid against the force of a return spring 563 in adjusting the force exerted by the setting spring 530. Thus, the slope of portions of the flyweight speed curves illustrated in FIG. 4, and thus the slope of the "flyweight average speed" in FIGS. 3 and 4, is biased or varied in response to braking conditions. Such slopes, identified as decelerations in appropriate units such as m/sec$^2$, reflect what persons skilled in the arts relating to brake controls for vehicles call "g-setting" or "g-setting value". The theory underlying variation in g-setting is explained more fully hereinafter, with accompanying equations. In practical embodiments of the sensor of FIG. 10, it is preferred that the cylinder 560 be connected to a wheel cylinder through its normal de-airing nipple in such a way that bleeding of the brake system is accomplished through the biasing cylinder 560 of the sensor, on which the only de-airing nipple of the hydraulic system for a particular wheel is thus situated. As a result, a single conduit bleeding system and the ease of maintenance which results therefrom are retained.

Figure 11:
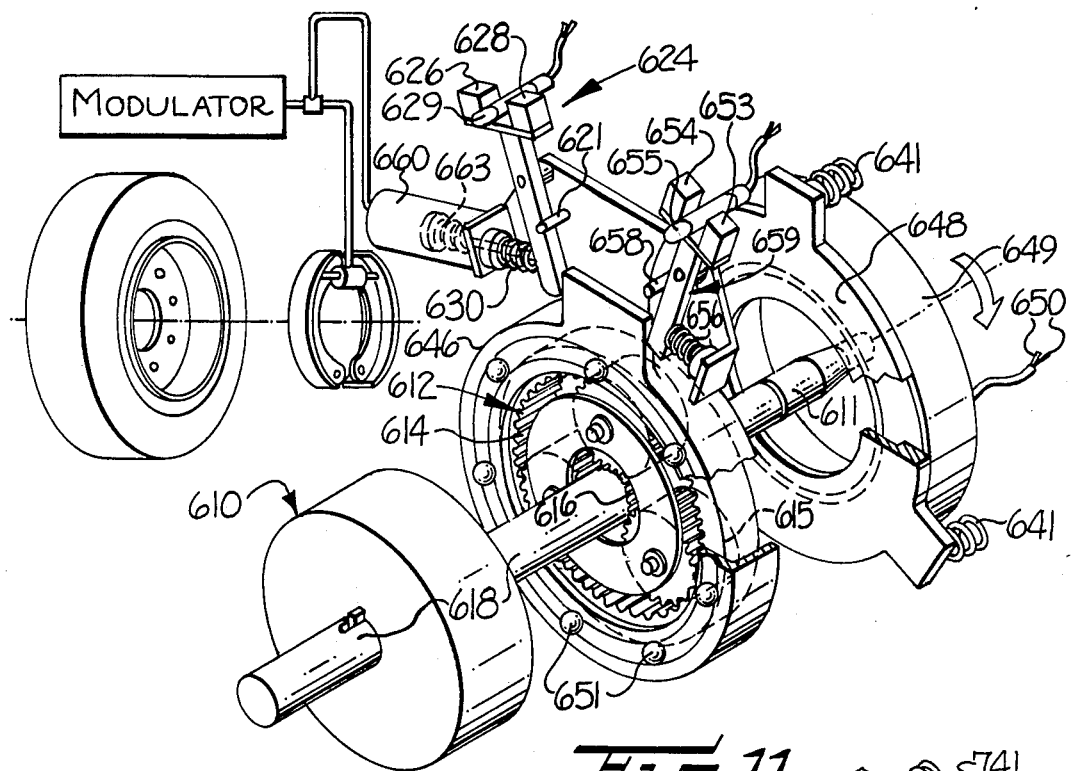

Such variation in g-settings of the sensor, by adjustment of spring tension, can additionally be accomplished in a sensor of the general form of FIG. 6, as shown more particularly in FIG. 11. There, a biasing cylinder 660 is applied to a setting spring 630 for one magnet carrier 624.

Figure 12:
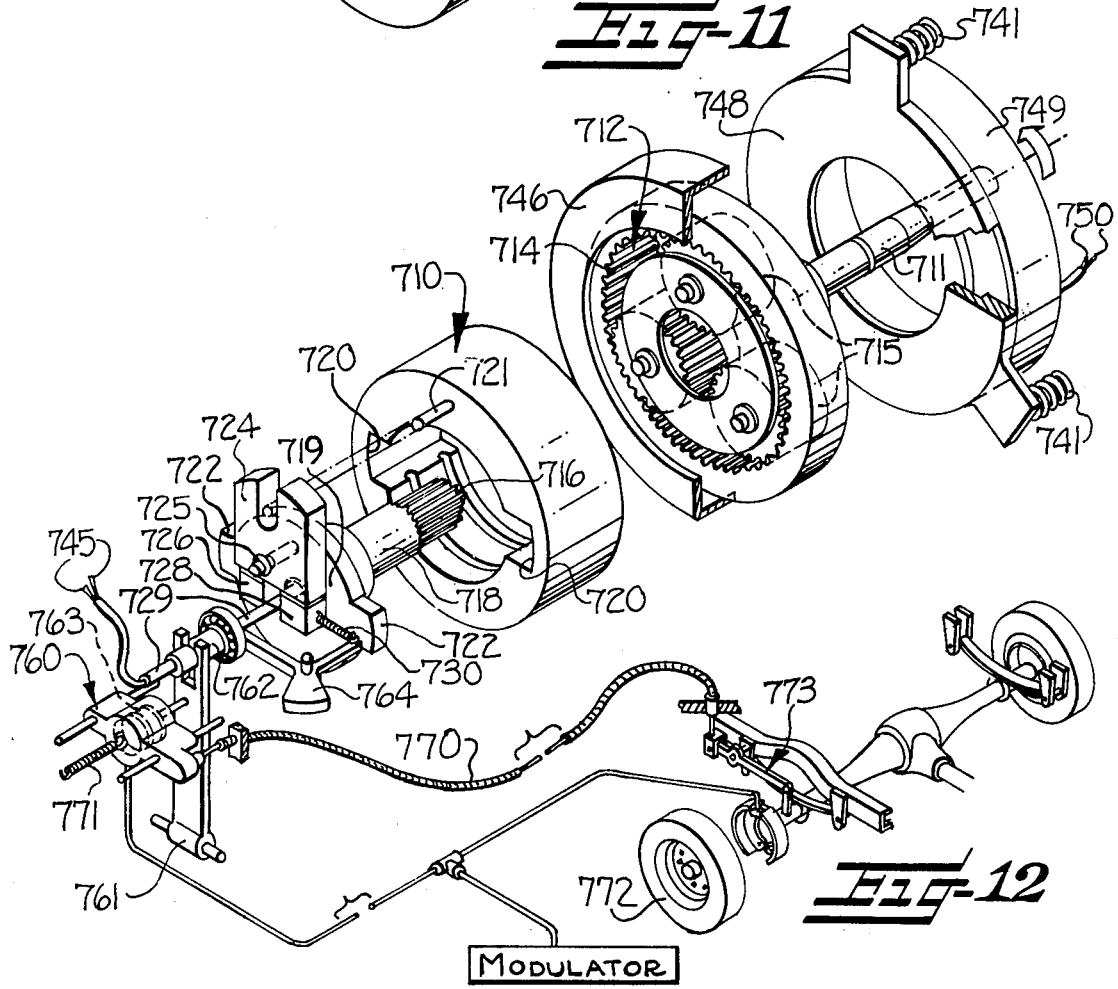

Due to the mounting of the reed switch in certain embodiments of sensors in accordance with the present invention directly upon the axis of rotation of rotating elements of the sensor, provision can be made for adjustment of a setting spring which acts between a magnet carrier and a disc as generally shown in FIGS. 1, 2 and 5. Such an arrangement is shown in FIG. 12, where a cylinder 760 acts on a lever 761 having a member 762 which encircles the reed switch 729. The member 762 is engaged by a lever member 764 mounted on and rotating with the disc 719 and operatively interconnected with the setting spring 730, which in this embodiment is a tension spring as distinguished from the compression springs shown in other figures.

The effect of changing the g-settings of a sensor is demonstrated mathematically by a series of equations resulting from assumptions that a vehicle is loaded so that the pressure of a wheel against a road surface may be represented as mg, with the coefficient of friction being $\mu$. It is further assumed that brake torque is directly proportional to fluid pressure, that the g-setting of a sensor for the wheel is governed by the fluid pressure between a modulator and the wheel cylinder, and that the g-setting is zero when the brakes are not actuated.

Upon actuation of the brakes, the g-setting of the sensor is gradually increased in suitable relation to fluid pressure, until such time as fluid pressure and thus brake torque has increased to a point at which the wheel tends to lock. The sensor g-setting thus is adapted to prevailing load and skid number conditions and certain mathematical relationships may be established.

Brake force = $mg \cdot \mu$
Retardation = $r$ $$mg = m \cdot r$$

$$r = g \cdot \mu \ldots \quad (1)$$

Brake force equals a constant times fluid pressure h, with the constant being a factor including the characteristics of the brake, the radius of the wheel and so forth. Consequently, $$mg = \mu = \text{const} \cdot h \ldots \quad (2)$$

The equations above show that vehicle load has no influence on achievable braking or retardation, but that fluid pressure follows the load. It would therefore appear that it is not entirely sufficient to govern the g-setting of a sensor in direct proportion to fluid pressure if the weight of the vehicle is not constant, but that a sensor responsive to fluid pressure would compensate perfectly for variations in skid number for a vehicle of substantially constant weight.

The arrangement of FIG. 12 additionally includes a Bowden wire 770 extending between the biasing cylinder 760 having a piston and return spring 763 and working as described with reference to FIGS. 10 and 11, and the suspension of an automotive vehicle including a braked wheel 772 with which the shaft 711 is connected. The Bowden wire 770 is arranged to move the biasing cylinder 760 against the force of a return spring 771 in response to variations in loading of the vehicle, as shown by compression of the suspension elements for the wheel 772, superimposing a variation in g-setting due to vehicle load changes on variation in g-setting due to brake pressure. Thus, the slopes of portions of the flyweight speeds shown in FIGS. 3 and 4 are responsive not only to braking pressure but to vehicle load as well. The g-settings at which the sensor responds thereby are accommodated to a wide range of vehicle operating conditions.

Figure 13:
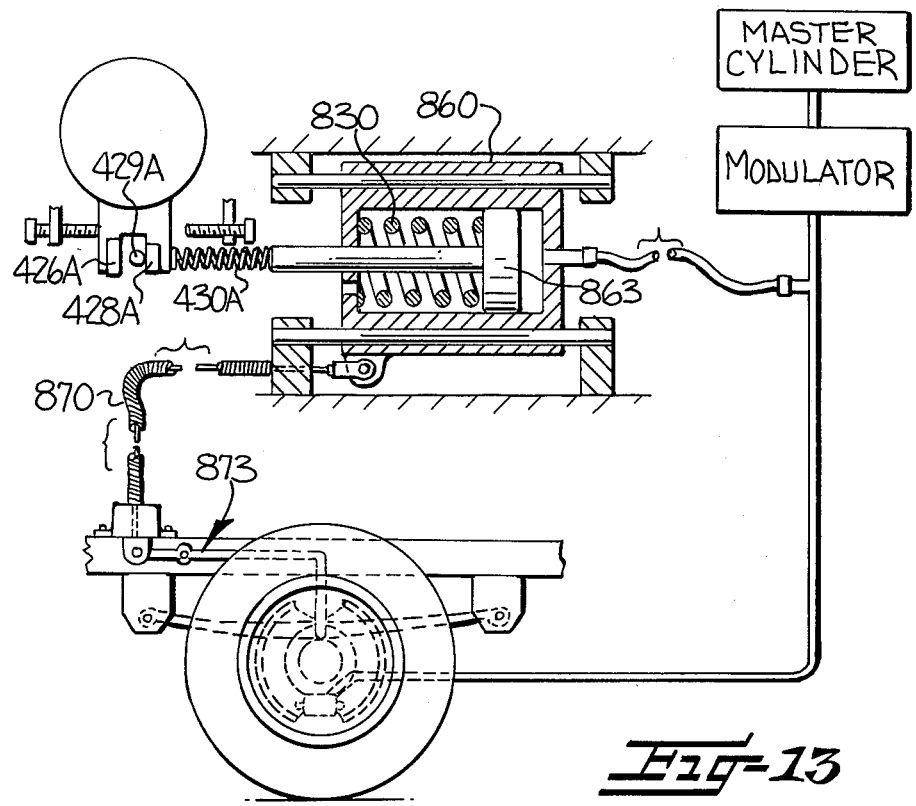
FIG. 13 is a schematic view, partly in elevation and partly in section, clarifying one approach to certain assemblies shown in FIGS. 10 through 12.

The figures referred to above have been perspective views primarily intended to clarify general sensor structures, and do not show the principles of the arrangements for varying g-settings quite so clearly as does FIG. 13. There, the sensor structure has been simplified to an end view of certain elements as described above with reference to FIGS. 5 and 7 through 10. The principles now to be described are, however, contemplated as being applicable to all sensor configurations described herein. In FIG. 13, the force exerted by a spring such as the setting spring 430A acting on an element of a sensor such as for example the sensor of FIGS. 8 and 9 may be adjusted by one or both of the vehicle operating conditions briefly pointed out above. More particularly, a Bowden wire 870 is arranged to move a cylinder 860 which encloses a piston 863 which is acted upon by the fluid pressure applied to a wheel brake cylinder. In operation, when no pressure is transmitted through the modulator to the brake cylinder, or when the brakes are not actuated, the force exerted through the setting spring 430A is minimized, corresponding to a low g-setting for the sensor. When the brake pedal is actuated, fluid pressure rises in the cylinder, overcoming the force of a retracting spring 830 and causing the piston to begin to move (to the left in FIG. 13) thereby exerting through the setting spring 430A a force corresponding to higher g-values. At some more elevated pressure condition, a point is reached at which the wheel tends to lock, and the sensor generates a signal to the modulator causing the brake pressure to be lowered. The brake pressure at which the sensor begins to signal is a measure of the frictional conditions existing between the wheel and the road surface, and the system has therefore adjusted the sensor to a g-value suitable for the existing condition.

This approach to adjustment of the g-values of sensors is adequate for vehicles where wheel pressure varies to a reasonable, somewhat limited extent in relation to how the vehicle is loaded, as is the case with heavy passenger automobiles. In smaller automobiles of relatively light weight, wheel pressures may vary to a considerable extent depending upon the number of persons occupying the vehicle and other load factors such as quantities of luggage. This difficulty may be even more extreme with certain cargo handling vehicles such as trucks, and it is known that wheel pressures in certain trucks may be four times higher when the truck is loaded than when it is not loaded.

The present invention contemplates that it is possible to substantially increase the efficiency and versatility of brake control systems for such vehicles by also using vehicle load conditions as a control parameter for g-values of sensors, as has been disclosed hereinabove with reference to FIG. 12. In FIG. 13, the greater the load imposed on the vehicle, the more the vehicle suspension system decreases the spacing between the frame and the axle. As a consequence, the Bowden wire 870 transmits movement to the cylinder (to the left in FIG. 13) biasing the setting spring 430A toward a higher sensor g-value. The load dependent g-value adjustment is thus superposed on the fluid pressure dependent g-value adjustment.

In the event that adjusting mechanisms similar to those disclosed in FIGS. 10 through 13 are to be used in compressed air brake systems, the cylinder arrangement may be varied by providing a differential pressure cylinder arrangement in which the total air pressure applied to a wheel cylinder is also applied to one side of a piston, while an opposing or counteracting hydraulic pressure is applied to the opposite side of the piston. In the event that the pressure ranges for the air and hydraulic fluids are of different orders of magnitude, such a differential piston arrangement may consist of two interconnected pistons of different size, in which event the opposing hydraulic fluid pressure is normally higher than the braking pneumatic pressure and, for that reason, the piston sensing pneumatic pressure will have the larger diameter.

As described to this point, the present invention has been illustrated in somewhat schematic form in order to make more clear the theory of operation thereof. However, it is believed informative at this point to refer more particularly to an illustration of one practical embodiment for sensors in accordance with the present invention, as shown in FIGS. 15 and 16. The precise structure chosen for illustration in FIGS. 15 and 16 corresponds in general structure and function to the arrangement of FIG. 2 described hereinabove and, accordingly, reference characters used in FIG. 2 have been applied to corresponding elements of the practical embodiment, with the addition of A as a suffix. Detailed description and discussion of the practical embodiment is deemed not necessary in light of the discussion given above. However, it is to be noted that the housing 175A enclosing the elements of the practical embodiment has been configured to be adaptable for the various combinations of structural components and functions described hereinabove.

Figure 17:
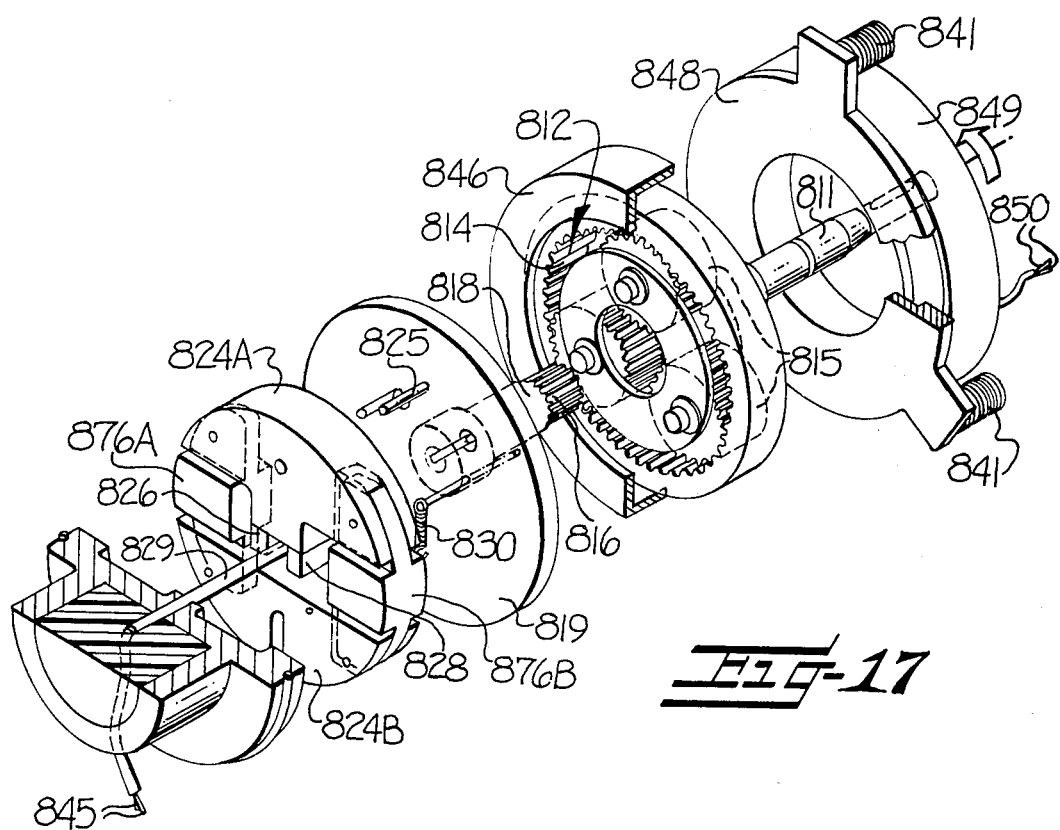
FIG. 17 is a view similar to FIGS. 1, 2, 5 through 8, and 10 through 12.
Figure 18:
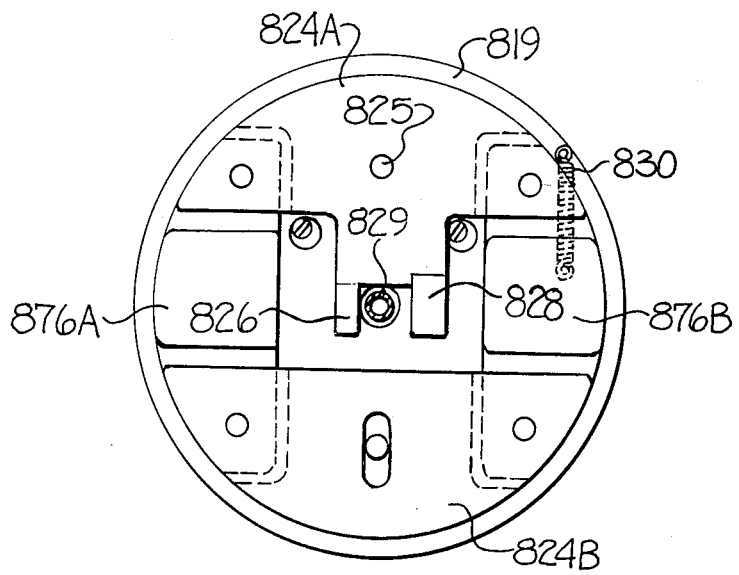
FIG. 18 is a sectional view through the sensor of FIG. 17.

As pointed out briefly above, the "flyweights" in the embodiments of sensors according to this invention which have been described to this point have inertia which is in some instances contributed in part by a flyweight mass such as the masses 10, 110 in FIGS. 1 and 2 and in part by a magnet carrier 24, 124. Recognizing this characteristic and seeking further variations in sensor frequencies and response times, it is contemplated for this invention that it is possible to use a magnet carrier as an eccentrically mounted flyweight provided that the magnet carrier is given a sufficient moment of inertia to permit a reasonable tension in the setting spring that will cooperate therewith. Such a sensor is illustrated in FIGS. 17 and 18, where elements corresponding to elements described above have been identified by like reference characters of an 800 order. The description which follows will be particularly directed to the distinctions between such a sensor and those described above.

As shown, the flyweight assembly is formed by two part-circular portions 824A and 824B joined by a pair of links 876A, 876B which pivotally connect the portions and keep all centrifugal forces within the flyweight assembly. One portion 824A mounts magnets 826, 828 functioning as described above.

For comparative purposes, response times attained by the sensors described above are shortest in the sensor of FIGS. 17 and 18, longest in the sensors of FIGS. 6, 8, 10 and 11 and intermediate in the remainder.

In the drawings and specification, there have been set forth preferred embodiments of the invention, and although specific terms are employed, they are used in a generic and descriptive sense only and not for purposes of limitation.

That which is claimed is:

1. In a sensor for responding to the rate of change of changing rotational speeds of a vehicle wheel and including a flyweight coupleable for rotation in response to wheel rotation and selectively decoupleable in response to the exertion on the flyweight of a torque having a magnitude greater than a threshold magnitude due to a change in rotational speed of the wheel, control means operatively connected with the flyweight for exerting on the flyweight torques resisting decoupled rotation of the flyweight, and signalling means operatively connected with the control means and responsive to decoupled rotation of the flyweight for signalling occurrences of an excessive rate of change in changing rotational speeds of the wheel, an improvement in said control means comprising means for exerting on said flyweight an average of a plurality of resistive torques.

2. A sensor according to claim 1 wherein said means for exerting an average torque comprises means for controllably exerting a first torque of relatively great magnitude and a second torque of a lesser magnitude and means for alternating between said first and second torques at a high rate of alternation.

3. A sensor according to claim 2 wherein said means for alternating between said torques is responsive to said signalling means.

4. A sensor according to one of claims 1 through 3 wherein said signalling means comprises electrical switch means for electrically signalling, and said means for exerting an average of a plurality of torques comprises an electrical operable coupling means operatively connected with and responsive to said switch means.

5. A sensor according to claim 4 wherein said coupling means comprises an electromagnetic clutch device.

6. A sensor according to claim 4 wherein said coupling means comprises a magnetic particle device.

7. A sensor according to claim 4 wherein said coupling means comprises an eddy current device.

8. A sensor according to claim 4 wherein said coupling means comprises a hysteresis device.

9. A sensor according to claim 4 wherein said coupling means comprises an electromotive device.

10. In a sensor for responding to the rate of change of changing rotational speeds of a vehicle wheel and including a flyweight coupleable for rotation in response to wheel rotation and selectively decoupleable in response to the exertion on the flyweight of a torque having a magnitude greater than a threshold magnitude due to a change in rotational speed of the wheel, planetary gearing coupling means for operatively interconnecting the flyweight and the wheel, control means operatively connected with the flyweight for exerting on the flyweight torques resisting decoupled rotation of the flyweight, and signalling means responsive to decoupled rotation of the flyweight for signalling occurrences of an excessive rate of change in changing rotational speeds of the wheel, an improvement in said control means comprising means for exerting on an orbit gear of said planetary gearing means a stick-slip restraint which is an average of a plurality of rotation resisting torques.

11. In a sensor for responding to the rate of change of changing rotational speeds of a vehicle wheel and including a flyweight coupleable for rotation in response to wheel rotation and selectively decoupleable in response to the exertion on the flyweight of a torque having a magnitude greater than a threshold magnitude due to a change in rotational speed of the wheel, control means operatively connected with the flyweight for exerting on the flyweight torques resisting decoupled rotation of the flyweight, and signalling means operatively connected with the control means and responsive to decoupled rotation of the flyweight for signalling occurrences of an excessive rate of change in changing rotational speed of the wheel, an improvement in said control means comprising means for exerting on said flyweight a plurality of different resistive torques representing a cycle and for continuously repeating the cycle at a frequency of from about 15 to about 100 Hertz, whereby said repeating cycle subjects said flyweight to a substantially constant deceleration.

12. In a sensor for responding to the rate of change of changing rotational speeds of a vehicle wheel and including a flyweight coupleable for rotation in response to wheel rotation and selectively decoupleable in response to the exertion on the flyweight of a torque having a magnitude greater than a threshold magnitude due to a change in rotational speed of the wheel, control means operatively connected with the flyweight for exerting on the flyweight torques resisting decoupled rotation of the flyweight, and signalling means operatively connected with the control means and responsive to decoupled rotation of the flyweight for signalling occurrences of an excessive rate of change in changing rotational speeds of the wheel, an improvement in said signalling means comprising magnetically actuable electrical switch means for electrically signalling occurrences of an excessive rate of change in rotational speeds of the wheel.

13. A sensor according to claim 12 wherein said switch means comprises magnetic means operatively connected with said flyweight for movement relative thereto in response to decoupled rotation thereof, and reed switch means mounted proximally to said magnetic means for actuation thereby upon movement of said magnetic means relative to said flyweight.

14. A sensor according to claim 13 further comprising setting means operatively connected with said magnetic means for imposing thereon and thereby on said flyweight forces resisting decoupled rotation of said flyweight.

15. A sensor according to one of claims 13 and 14 wherein said magnetic means comprises a pair of permanent magnets mounted in field bucking relation one to the other.

16. In a sensor for responding to the rate of change of changing rotational speeds of a vehicle wheel and including a flyweight coupleable for rotation in response to wheel rotation and selectively decoupleable in response to the exertion on the flyweight of a torque having a magnitude greater than a threshold magnitude due to a change in rotational speed of the wheel, planetary gearing coupling means for operatively interconnecting the flyweight and the wheel, control means operatively connected with the flyweight for exerting on the flyweight torques resisting decoupled rotation of the flyweight, and signalling means responsive to decoupled rotation of the flyweight for signalling occurrences of an excessive rate of change in changing rotational speeds of the wheel, an improvement in said signalling means comprising magnetic means operatively connected with one of an orbit gear and a sun gear of said planetary gearing means for movement relative thereto in response to decoupled rotation of said flyweight, and magnetically actuable switch means mounted proximately to said magnetic means for actuation thereby upon movement of said magnetic means.

17. A sensor according to claim 16 wherein said magnetic means is operatively connected with said orbit gear and further comprising setting means operatively connected with said magnetic means for imposing thereon and thereby on said flyweight forces resisting decoupled rotation of said flyweight.

18. A sensor according to claim 16 wherein said magnetic means is operatively connected with said sun gear and further comprising setting means operatively connected with said magnetic means for imposing thereon and thereby on said flyweight forces resisting decoupled rotation of said flyweight.

19. A sensor according to one of claims 17 and 18 further having an improvement in said control means comprising means for operatively responding to vehicle operating conditions by imposing on said setting means forces controllably varying said rotation resisting forces in accordance with variance in vehicle operating conditions.

20. A sensor according to claim 19 wherein said means responsive to vehicle operating conditions is responsive to brake fluid pressure.

21. A sensor according to claim 19 wherein said means responsive to vehicle operating conditions is responsive to vehicle load.

22. In a braking system for a vehicle wheel and having anti-lock control means; and sensor means for actuating the anti-lock means including a flyweight coupleable for rotation in response to wheel rotation, means operatively interconnecting the flyweight and the wheel for selectively decoupling the flyweight from the wheel upon a torque having a magnitude greater than a threshold magnitude being exerted therebetween due to a change in rotational speed of the wheel, and control means for exerting on the flyweight a torque resisting decoupled rotation of the flyweight, the improvement in said control means comprising means for controllably exerting on the flyweight a first torque of a predetermined magnitude and a second torque of a lesser magnitude, and means for alternating between said first and second torques at a high rate of alternation.

23. In a braking system for a vehicle wheel and having anti-lock control means responsive to an electrical signal; and sensor means for electrically signalling the anti-lock means including a flyweight rotatable in response to wheel rotation and rotatable means operatively interconnecting the flyweight and the wheel for yieldably coupling the same, the interconnecting means being normally coupled with the flyweight for common rotation of the wheel and the flyweight, and being decoupled from the flyweight and accommodating decoupled rotation between the flyweight and the interconnecting means upon a torque having a magnitude greater than a threshold magnitude being exerted therebetween as a result of deceleration in rotational speed of the wheel, and being recoupled with the flyweight upon the interconnecting means and the flyweight again reaching common rotation as a result of acceleration in rotational speed of the wheel; the improvement wherein said sensor means comprises magnetically actuable electrical switch means operatively connected with said anti-lock means for signalling the same, and magnetic field means magnetically coupled with said switch means and operatively connected with said interconnecting means for actuating said switch means in response to decoupled rotation between said flyweight and said interconnecting means.

24. In a braking system for a vehicle wheel and having anti-lock control means responsive to an electrical signal; and sensor means for electrically signalling the anti-lock means including a flyweight rotatable in response to wheel rotation and planetary gearing means for normally coupling the flyweight and the wheel for common rotation thereof at a ratio of rotational speeds other than 1:1, the gearing means having a sun gear, a planet gear and an orbit gear with one of the gears being operatively connected with the flyweight to drive the same, and adjustable restraining means for engaging the remaining one of the gears for accomplishing a yieldable coupling of the wheel and flyweight, the gearing means being normally coupled with the flyweight for rotation of the wheel and the flyweight at the ratio of rotational speeds, and being decoupled from the flyweight and accommodating decoupled rotation between the flyweight and the one gear upon a torque having a magnitude greater than a threshold magnitude being exerted therebetween as a result of deceleration in rotational speed of the wheel, and being recoupled with the flyweight upon the one gear and the flyweight again reaching the ratio of rotational speeds as a result of acceleration in rotational speed of the wheel; the improvement wherein said sensor means comprises magnetically actuable electrical switch means operatively connected with said anti-lock means for signalling the same, and magnetic field means magnetically coupled with said switch means and operatively connected with said gearing means for actuating said switch means in response to decoupled rotation between said flyweight and said one gear.

25. In a braking system for a vehicle wheel and having a fluid pressure actuated brake; a conduit operatively communicating with the brake for applying thereto fluid under pressure; anti-lock control means interposed in the conduit for controllably interrupting and releasing the application of fluid pressure to the brake; and sensor means for actuating the anti-lock means including a flyweight rotatable in response to wheel rotation and rotatable means operatively interconnecting the flyweight and the wheel for yieldably coupling the same, the interconnecting means including means for limiting the rate of deceleration of the flyweight to a controlled rate and being normally coupled with the flyweight for common rotation of the wheel and the flyweight, being decoupled from the flyweight and accommodating decoupled rotation between the flyweight and the interconnecting means upon a torque having a magnitude greater than a threshold magnitude being exerted therebetween as a result of deceleration in rotational speed of the wheel, and being recoupled with the flyweight upon the interconnecting means and the flyweight again reaching common rotation as a result of acceleration in rotational speed of the wheel, the improvement wherein said deceleration limiting means comprises setting means for determining a value for said rate, and fluid pressure actuated biasing means operatively communicating with said conduit intermediate said brake and said anti-lock means and operatively coupled with said setting means for controllably varying said rate in response to increase and decrease in fluid pressure applied to said brake.

26. In a braking system for a vehicle and having a fluid pressure actuated brake; a conduit operatively communicating with the brake for applying thereto fluid under pressure; anti-lock control means interposed in the conduit for controllably interrupting and releasing the application of fluid pressure to the brake; and sensor means for actuating the anti-lock means including a flyweight rotatable in response to wheel rotation and planetary gearing means for normally coupling the flyweight and the wheel for common rotation thereof at a ratio of rotational speed other than 1:1, the gearing means having a sun gear, a planet gear and an orbit gear with one of the gears being operatively connected with the wheel to be driven thereby and another of the gears being operatively connected with the flyweight to drive the same, and adjustable restraining means for engaging the remaining one of the gears for yieldably coupling the wheel and flyweight while limiting the rate of deceleration of the flyweight to a controlled rate, the gearing means being normally coupled with the flyweight for rotation of the wheel and the flyweight at the ratio of rotational speeds, being decoupled from the flyweight and accommodating decoupled rotation between the flyweight and the one gear upon a torque having a magnitude greater than a threshold magnitude being exerted therebetween as a result of deceleration in rotational speed of the wheel, and being recoupled with the flyweight upon the one gear and the flyweight again reaching the ratio of rotational speeds as a result of acceleration in rotational speed of the wheel, the improvement wherein said adjustable restraining means comprises setting means for determining a value for said rate, and fluid pressure actuated biasing means operatively communicating with said conduit intermediate said brake and said anti-lock means and operatively coupled with said setting means for controllably increasing and decreasing said rate in response to increase and decrease in fluid pressure applied to said brake.

27. In a method of sensing the occurrence of an excessive rate of retardation of a braked rotating member including coupling a flyweight for rotation in response to member rotation, selectively decoupling the flyweight from the member upon a torque having a magnitude greater than a threshold magnitude being exerted between the member and the flyweight due to a change in rotational speed of the member, and exerting on the decoupled flyweight a torque resisting decoupled rotation thereof, the improvement in the step of exerting rotation resisting torque which comprises controllably exerting on the flyweight an average of first and second resistive torques, one of said first and second torques having a higher magnitude than the other.

28. In a method of sensing the occurrence of an excessive rate of retardation of a braked rotating member including coupling a flyweight for rotation in response to member rotation, selectively decoupling the flyweight from the member upon a torque having a magnitude greater than a threshold magnitude being exerted between the member and the flyweight due to a change in rotational speed of the member, and exerting on the decoupled flyweight a torque resisting decoupled rotation thereof, the improvement in the step of exerting rotation resisting torque which comprises successively exerting on said flyweight a plurality of different resistive torques representing a cycle and continuously repeating said cycle at a frequency of from about 15 to about 100 Hertz for subjecting the flyweight to a substantially constant deceleration.

29. A method according to claim 28 further comprising controlling the value of at least one of the resistive torques so as to control the rate of the substantially constant deceleration.

30. A method according to claim 28 further comprising controlling the duration of at least one portion of the cycle so as to control the rate of the substantially constant deceleration.

31. In a method of sensing the occurrence of an excessive rate of retardation of a braked rotating member including coupling a flyweight for rotation in response to member rotation, selectively decoupling the flyweight from the member upon a torque having a magnitude greater than a threshold magnitude being exerted between the member and the flyweight due to a change in rotational speed of the member, and exerting on the decoupled flyweight a torque resisting decoupled rotation thereof, the improvement in the step of exerting rotation resisting torque which comprises controllably exerting on the flyweight a first torque of a predetermined magnitude and a second torque of a lesser magnitude, and alternating between the first and second torques at a high rate of alternation.

32. A method according to claim 31 wherein the step of alternating comprises switching between the torques at a frequency in the range of from about 15 Hertz to about 100 Hertz.

33. In a method of braking an automotive vehicle wheel including supplying pressurized fluid, applying the pressurized fluid to a wheel brake, sensing the occurrence of an excessive rate of retardation of the braked wheel, and modulating the pressure of the fluid to decrease and reapply braking of the wheel in response to such sensed occurrence and further wherein the sensing includes coupling a flyweight for rotation in response to wheel rotation, selectively decoupling the flyweight from the wheel upon a torque having a magnitude greater than a threshold magnitude being exerted between the wheel and the flyweight due to a change in rotational speed of the wheel, and exerting on the decoupled flyweight a torque resisting decoupled rotation thereof, the improvement in the step of exerting rotation resisting torque which comprises controllably exerting on the flyweight an average of first and second resistive torques, one of said first and second torques having a higher magnitude than the other.

34. In a method of braking an automotive vehicle wheel including supplying pressurized fluid, applying the pressurized fluid to a wheel brake, sensing the occurrence of an excessive rate of retardation of the braked wheel, and modulating the pressure of the fluid to decrease and reapply braking of the wheel in response to such sensed occurrence and further wherein the sensing includes coupling a flyweight for rotation in response to wheel rotation, selectively decoupling the flyweight from the wheel upon a torque having a magnitude greater than a threshold magnitude being exerted between the wheel and the flyweight due to a change in rotational speed of the wheel, and exerting on the decoupled flyweight a torque resisting decoupled rotation thereof, the improvement in the step of exerting rotation resisting torque which comprises controllably exerting on the flyweight a first torque of a predetermined magnitude and a second torque of a lesser magnitude, and alternating between the first and second torques at a high rate of alternation.

35. In a method of signalling the occurrence of an excessive rate of retardation of a braked rotating member including coupling a flyweight for rotation in response to member rotation, selectively decoupling the flyweight from the member upon a torque having a magnitude greater than a threshold magnitude being exerted between the member and the flyweight due to a change in rotational speed of the member, and signalling in response to decoupled rotation of the flyweight, the improvement in the step of signalling which comprises moving a magnet relative to a magnetically actuable switch, and thereby changing the conductive state of the switch.

36. In a method of braking an automotive vehicle wheel including supplying pressurized fluid, applying the pressurized fluid to a wheel brake, sensing the occurrence of an excessive rate of retardation of the braked wheel, and modulating the pressure of the fluid to decrease and reapply braking of the wheel in response to such sensed occurrence and further wherein the sensing includes coupling a flyweight for rotation in response to wheel rotation, selectively decoupling the flyweight from the wheel upon a torque having a magnitude greater than a threshold magnitude being exerted between the wheel and the flyweight due to a change in rotational speed of the wheel, and signalling in response to decoupled rotation of the flyweight the improvement in the step of signalling which comprises moving a magnet relative to a magnetically actuable switch, and thereby changing the conductive state of the switch.

37. In a sensor for responding to the rate of change of changing rotational speeds of a vehicle wheel and including a flyweight coupleable for rotation in response to wheel rotation and selectively decoupleable in response to the exertion on the flyweight of a torque having a magnitude greater than a threshold magnitude due to a change in rotational speed of the wheel, planetary gearing coupling means for operatively interconnecting the flyweight and the wheel, control means operatively connected with the planetary gearing means for exerting torque resisting decoupled rotation of the flyweight, and signalling means responsive to decoupled rotation of the flyweight for signalling occurrences of an excessive rate of change in changing rotational speeds of the wheel, an improvement in said control means comprising electrically operable means for exerting a restraint on an orbit gear of said planetary gearing means.

38. A sensor according to claim 37 wherein said electrically operable means comprises an electromagnetic clutch device.

39. A sensor according to claim 37 wherein said electrically operable means comprises a magnetic particle device.

40. A sensor according to claim 37 wherein said electrically operable means comprises an eddy current device.

41. A sensor according to claim 37 wherein said electrically operable means comprises a hysteresis device.

42. A sensor according to claim 37 wherein said electrically operable means comprises an electromotive device.

43. A sensor according to claim 37 wherein said signalling means comprises magnet means operatively connected with one of an orbit gear and a sun gear of said planetary gearing means for movement relative thereto in response to decoupled rotation of said flyweight, and magnetically actuable switch means mounted proximately to said magnetic means for actuation thereby upon movement of said magnetic means.

44. A sensor according to claim 43 wherein said magnetic means is operatively connected with said orbit gear and further comprising setting means operatively connected with said magnetic means for imposing thereon and thereby on said flyweight forces resisting decoupled rotation of said flyweight.

45. A sensor according to claim 43 wherein said magnetic means is operatively connected with said sun gear and further comprising setting means operatively connected with said magnetic means for imposing thereon and thereby on said flyweight forces resisting decoupled rotation of said flyweight.

46. A sensor according to one of claims 44 and 45 further having an improvement in said control means comprising means for operatively responding to vehicle operating conditions by imposing on said setting means forces controllably varying said rotation resisting forces in accordance with variations in vehicle operating conditions.

47. A sensor according to claim 46 wherein said means responsive to vehicle operating conditions is responsive to brake fluid pressure.

48. A sensor according to claim 46 wherein said means responsive to vehicle operating conditions is responsive to vehicle load.

49. A sensor according to claim 46 wherein said means responsive to vehicle operating condition is responsive to both brake fluid pressure and vehicle load.

50. In a braking system for a vehicle having a rotating wheel, a fluid pressure actuated brake operative for slowing the rotating wheel, a sensor operatively coupled to the wheel for signalling any occurrence of an excessive rate of retardation of the wheel, and a brake modulator operatively connected to the brake and to the sensor for controlling the slowing of the rotating wheel in response to a signaled occurrence of an excessive rate of retardation, the improvement comprising means operatively connected to at least one of said sensor and said modulator and responsive to vehicle operating conditions for controllably varying the braking system response in accordance with variations in vehicle operating conditions, said means responsive to vehicle operating conditions comprising cylinder means for receiving pressurized fluid, means mounting said cylinder means for movement, means operatively connecting said mounting means with the vehicle for moving said cylinder means in response to variations in vehicle load, conduit means operatively communicating with said cylinder means and with said brake, and piston means movable within and with said cylinder means in response to both brake fluid pressure and vehicle load and connected with at least one of said sensor and said modulator for controllably varying braking system response.

51. A system according to claim 50 wherein said piston means is operatively connected with said sensor.

* * * * *